(12) United States Patent
Fruhmann et al.

(10) Patent No.: US 8,360,454 B2
(45) Date of Patent: Jan. 29, 2013

(54) BEARING MECHANISM FOR A TRANSVERSE LEAF SPRING

(75) Inventors: Gabriele Fruhmann, Bregenz (AT); Volker Wagner, Ravensburgh (DE); Jens Heimann, Stetten (DE); Peter Hofmann, Gauting (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/392,194

(22) PCT Filed: Aug. 11, 2010

(86) PCT No.: PCT/EP2010/061677
§ 371 (c)(1),
(2), (4) Date: Feb. 24, 2012

(87) PCT Pub. No.: WO2011/023548
PCT Pub. Date: Mar. 3, 2011

(65) Prior Publication Data
US 2012/0146310 A1    Jun. 14, 2012

(30) Foreign Application Priority Data
Aug. 26, 2009    (DE) .......................... 10 2009 028 896

(51) Int. Cl.
*B60G 11/10* (2006.01)
(52) U.S. Cl. ..................................... 280/124.175; 267/7
(58) Field of Classification Search ............. 280/124.17, 280/124.171, 124.175, 680, 686; 267/3, 267/6, 7, 30, 140.4, 141.1–141.5
See application file for complete search history.

(56) References Cited

U.S. PATENT DOCUMENTS

| | | | |
|---|---|---|---|
| 2,697,613 A * | 12/1954 | Giacosa | 280/124.14 |
| 3,181,641 A | 5/1965 | Haddad | |
| 3,377,060 A | 4/1968 | Sherwood | |
| 4,630,804 A | 12/1986 | Fesko | |
| 4,643,406 A | 2/1987 | Mounier-Poulat et al. | |
| 4,684,110 A | 8/1987 | Sale et al. | |
| 5,826,896 A | 10/1998 | Baumann | |
| 6,220,580 B1 | 4/2001 | Balczun | |
| 7,651,107 B1 * | 1/2010 | Chapin et al. | 280/124.165 |
| 2012/0146308 A1 * | 6/2012 | Fruhmann et al. | 280/124.175 |
| 2012/0146309 A1 * | 6/2012 | Fruhmann et al. | 280/124.175 |
| 2012/0146310 A1 * | 6/2012 | Fruhmann et al. | 280/124.175 |

(Continued)

FOREIGN PATENT DOCUMENTS

| | | |
|---|---|---|
| DE | 4239512 A1 | 5/1994 |
| DE | 19533803 A1 | 3/1997 |

(Continued)

*Primary Examiner* — Drew Brown
(74) *Attorney, Agent, or Firm* — Davis & Bujold, PLLC

(57) ABSTRACT

A bearing mechanism for a transverse leaf spring that can be mounted in the region of an axle of a vehicle. The bearing mechanism comprises an outer bearing shell and insertion devices which have at least some regions encompassed by the outer bearing shell, and which each comprise layered elements having different stiffness. When assembled, the insertion devices are disposed between the outer bearing shell and the leaf spring. The leaf spring has a recess into which sections of the insertion devices engage. The recesses are located on opposed top and bottom surfaces of the leaf spring, with respect to a vertical axis of the vehicle. In the mounted state of the leaf spring, the recesses are delimited by top and bottom edge regions that are formed between top, bottom and lateral surfaces, in the longitudinal direction of the vehicle.

16 Claims, 32 Drawing Sheets

U.S. PATENT DOCUMENTS

| | | | |
|---|---|---|---|
| 2012/0153593 A1* | 6/2012 | Fruhmann et al. | 280/124.175 |
| 2012/0153594 A1* | 6/2012 | Heimann et al. | 280/124.175 |

FOREIGN PATENT DOCUMENTS

| | | |
|---|---|---|
| DE | 102 28 902 A1 | 2/2004 |
| EP | 0 373 389 A2 | 6/1990 |
| EP | 0 763 438 A2 | 3/1997 |
| EP | 0993971 A2 | 4/2000 |
| EP | 1 645 445 A1 | 4/2006 |
| FR | 2543073 A1 | 9/1984 |
| JP | 4059406 A | 2/1992 |
| JP | 4 297313 A | 10/1992 |
| JP | 7 039242 B | 5/1995 |
| WO | 2008/125076 A1 | 10/2008 |

* cited by examiner

BEARING MECHANISM FOR A TRANSVERSE LEAF SPRING

This application is a national stage completion of PCT/EP2010/061677 filed Aug. 11, 2010 which claims priority from German Application Serial No. 10 2009 028 896.1 filed Aug. 26, 2009.

FIELD OF THE INVENTION

The invention relates to a bearing mechanism for a transverse leaf spring.

BACKGROUND OF THE INVENTION

A wheel suspension for a motor vehicle having a transverse leaf spring disposed transverse to the motor vehicle is known from the document EP 1 645 445 B1. The transverse leaf spring comprises a central region and two opposing end regions, where the transverse leaf spring is connected in the central region to a vehicle chassis via two central bearings, and in the end regions it is operatively connected to wheel carriers via end bearings.

The layer elements of the insertion devices that in the installed state face toward the transverse leaf spring and are designed with increased stiffness, are bolted together in the longitudinal direction of the vehicle, both before and after the transverse leaf spring, whereby the insertion devices can be preassembled at the transverse leaf spring independently of the outer bearing shells. In addition, pretensioning forces in the region of the insertion devices can be precisely adjusted via the bolted connections. The outer bearing shells are securely connected together via a separate bolted connection, and abut each other in the region of a separation plane.

A recess for each of the insertion devices is formed in the region of a support surface of the transverse leaf spring, and at least sections of the insertion devices engage therein in a form-locking manner. The recesses of the transverse leaf spring in the installed state thereof are substantially oriented in the longitudinal direction of the vehicle, and extend over the entire width of the transverse leaf spring.

It is disadvantageous that an assembly of the wheel suspension, particularly an assembly of the central bearings in the region of the support surfaces of the transverse leaf spring, is complicated because a position of the central bearings at the transverse leaf spring is not uniquely defined in the longitudinal direction of the vehicle, and a defined positioning of the central bearings at the transverse leaf spring in the longitudinal direction of the vehicle for trouble-free operation of wheel suspension is not guaranteed during assembly.

SUMMARY OF THE INVENTION

Therefore, the problem addressed by the present invention is that of providing a bearing mechanism of a transverse leaf spring that can be mounted in the region of a vehicle axle of a vehicle, can be assembled in a simple manner and to the extent necessary for the operation.

The bearing mechanism according to the invention for a transverse leaf spring that can be mounted in the region of a vehicle axle of a vehicle is formed having an outer bearing shell device and insertion devices, at least some regions of which are encompassed by the outer bearing shell device, and which each comprise at least two layer elements having different stiffness. The insertion devices in the assembled state thereof are each disposed between the outer bearing shell device and the transverse leaf spring, and a recess for each of the insertion devices is formed in the region of a support surface of the transverse leaf spring, and at least sections of the insertion devices engage therein in a form-locking manner. With respect to a vertical axis of the vehicle, the recesses are located on a top side and a bottom side of the transverse leaf spring.

According to the invention, the recesses in the transverse leaf spring in the assembled state thereof are each delimited, at least in sections, by edge regions of the top side and bottom side formed between the top side and the bottom side and the lateral surfaces, where the recesses in the edge regions have a shallower depth than in the region between the edge regions.

Rotational movement of the transverse leaf spring in the region of the bearing device required for operating the transverse leaf spring with simultaneously sufficiently high bearing rigidity is possible due to the layer elements of the insertion devices being designed with different stiffnesses, whereby different spring rates can be adjusted for the unidirectional and alternating deflections in the region of the wheels of the two sides of the vehicle.

In addition, wheel suspension functions can also be adjusted using the transverse leaf spring due to the different stiffnesses of the layer elements, because bearing stiffness in the transverse direction of the vehicle for example can be set appropriately high, and shifting of the transverse leaf spring in the transverse direction of the vehicle can be avoided in a simple manner.

Additionally, bearing stiffness of the bearing mechanism according to the invention can be sufficiently adjusted also in the vertical direction of the vehicle by means of a sufficient frictional connection between the bearing mechanism and the transverse leaf spring. In this simple manner, it is possible during alternating deflections to avoid undesired shifting corresponding to a rigid body, or movement of the transverse leaf spring in the region of the bearing mechanism. With appropriately high bearing stiffness of the bearing mechanism according to the invention in the vertical direction of the vehicle, a targeted deformation of the transverse leaf spring is attained in the shape of a so-called S-stroke, resulting in a higher alternating spring rate in the region of the transverse leaf spring compared to simultaneous deflections without an appropriate S-stroke.

During operation of a vehicle, acting forces and torques can be introduced from the insertion devices into the transverse leaf spring without relative movement between the insertion devices and the transverse leaf spring because the insertion devices are designed having receiving devices in the contact surfaces facing the support surfaces of the transverse leaf spring, and a region of the transverse leaf spring engages into these receiving devices in the assembled state of the insertion devices. The form-locking between the bearing mechanism and the transverse leaf spring is preferably designed such that the lowest possible additional stresses arise in the transverse leaf spring due to the form locking; such forces possibly impact the function of the transverse leaf spring to an undesired extent and reduce the service life of the transverse leaf spring.

Assembly of the bearing mechanism into the position necessary for operating the transverse leaf spring is simplified in comparison to the solution known from the prior art with low constructive expense and cost-effectively by limiting the recesses, at least in sections, of the transverse leaf spring in the assembled state thereof in the longitudinal direction of the vehicle in the area of the edge regions of the top side and the bottom side, formed between the top side and the bottom side and the lateral surfaces.

Because in an advantageous embodiment of the bearing mechanism according to the invention, the insertion devices in the contact surfaces facing the support surfaces of the transverse leaf spring are designed having at least one receiving device into which in a region of the transverse leaf spring engages in the assembled state of the insertion devices, an additional form-locking is provided between the transverse leaf spring and the insertion devices by means of which a position defined in the longitudinal direction of a vehicle is given during assembly of the bearing mechanism to the transverse leaf spring, and assembly of the bearing mechanism to the transverse leaf spring is greatly simplified in comparison to central bearings known from the prior art. Due to the position of the bearing mechanism on the transverse leaf spring in the longitudinal direction of the vehicle being defined by the additional form-locking, trouble-free operation of the transverse leaf spring is guaranteed without additional measures during the assembly.

Preferably, the regions of the transverse leaf spring engaging into the insertion devices are in the region of the recess of the transverse leaf spring, whereby progression of fibers of a transverse leaf spring preferably produced from a composite material deviate only minimally in the region of the bearing mechanism from the progression necessary for the operation of the transverse leaf spring.

In an easy-to-assemble further development of the bearing mechanism according to the invention, the outer bearing shell device has two outer bearing shells that can be connected together, and which encompass the insertion devices at least in sections.

In a space-saving embodiment of the bearing mechanism according to the invention, the insertion devices can be connected to the outer bearing shells and the transverse leaf spring via a bolt device connecting outer bearing shells together and to a vehicle chassis at least in a force locking manner. The space-saving embodiment results from the fact that the bearing mechanism can be assembled on the transverse leaf spring merely in the region of the outer bearing shells using a bolt device that in turn solidly connects the bearing mechanism to the vehicle chassis or to an auxiliary frame connected thereto. Furthermore, in the assembled state of the bearing mechanism, pretensioning force is applied to the insertion devices via the bolt device.

As there are no additional bolt devices in the region of the insertion devices, the layer elements can be designed with small dimensions and also produced cost-effectively because no threads need to be cut into the layer element, for example.

The transfer of forces and torques acting during operation of the vehicle between the vehicle chassis and the wheels using the transverse leaf spring and the bearing mechanism can be further improved if the transverse leaf spring is formed having convex elevations in contact surfaces for the insertion devices disposed on the top side and the bottom side with respect to a vertical axis of the vehicle, and a form-locking transfer of the load is possible during operation.

In order to be able to transfer forces and torques acting during operation of a vehicle from the layer elements with the lowest possible surface pressure and designed with low stiffness, into the region between the insertion devices and transverse leaf spring, an insertion part of the insertion devices that is at least nearly semi-cylindrical, is disposed in each case between the layer elements of the insertion devices and the transverse leaf spring; the insertion part being designed preferably with greater stiffness than the layer elements designed with lower stiffness.

The term insertion parts designed at least nearly semi-cylindrically includes all volumetric shapes which are designed at least having at least nearly circular segment-like base surfaces offset to each other. The possibility exists that the curve of the base connecting the chord ends is designed having a circular or elliptical shape. In further developments, the chord is formed straight or possibly curved, preferably convex. Depending on the respective application case, the region of the transitions between the chord and the curve of the base can have edges or corresponding roundings.

In order to avoid damaging the transverse leaf spring in the region of the bearing mechanism during operation of the vehicle, the insertion parts of the insertion devices can be formed having a resilient protective coating at least in contact regions facing the transverse leaf spring in the assembled state.

The bearing stiffness of the bearing mechanism according to the invention can be varied in that at least the layer elements formed with lower stiffness comprise recesses.

In a further advantageous embodiment of the bearing mechanism according to the invention, the layer elements formed with greater stiffness at least in the end regions are formed having a resilient protective coating at least in regions, so therefore damage to the transverse leaf spring in the case of a strong deformation of the transverse leaf spring can be avoided in a simple manner.

The layer elements of the insertion devices formed with the lower stiffness and having bulge-like end regions preferably pointing in the transverse vehicle direction in the assembled state, each encompass the outer bearing shells in an advantageous embodiment of the mechanism according to the invention, wherein each outer bearing shell device preferably engages into the bulge-like end regions of the layer elements with projections. As a result, the insertion devices can be appropriately positioned in the transverse vehicle direction with respect to the outer bearing shell device, whilst in a further advantageous embodiment of the bearing mechanism according to the invention, the positioning between the insertion devices and the outer bearing shell device in the longitudinal vehicle direction is guaranteed using projections of the outer bearing shell device engaging into the layer elements or the bulge-like end regions thereof, and therefore it is possible to easily assemble the bearing mechanism.

In a further advantageous embodiment of the bearing mechanism according to the invention, the layer elements formed with the lower stiffness overlap the transverse leaf spring with stop regions in the assembled state in the longitudinal direction of the vehicle and in the vertical direction of the vehicle at least in sections, in order to be able to position the multi-part insertion devices during assembly in a simple manner with respect to the transverse leaf spring, and to be able to supply a soft support of the transverse leaf spring in the longitudinal direction of the vehicle in the region of the outer bearing shells in a constructively simple manner.

The stop regions can be formed in contact regions facing the transverse leaf spring and/or in the contact regions facing the outer bearing shell device, having projections and/or recesses oriented at least nearly in the longitudinal direction of the vehicle, in order to attain different bearing stiffnesses via the shift of the transverse leaf spring in the region of the bearing mechanism according to the invention, where the stop regions acting as a bearing stops can be designed differently ahead of and behind the transverse leaf spring in the longitudinal direction of the vehicle with respect a front of the vehicle in order to be able to represent correspondingly different bearing characteristics.

In a further advantageous embodiment of the bearing mechanism according to the invention, the outer bearing shell device comprises a one-piece bearing ring element, and the insertion devices can be operatively connected at least in a force locking manner to the bearing ring element and the transverse leaf spring via tensioning elements. This embodiment of the bearing mechanism saves construction space in comparison to bearing mechanisms known from the prior art, because this bearing mechanism is only mounted to the vehicle chassis, or to an auxiliary frame connected to the vehicle chassis, in the region of the bearing ring elements. The fixed connection of the bearing mechanism to the transverse leaf spring is produced using the tensioning elements interacting with the insertion devices in the assembled state, and via these tensioning elements, pretensioning force can be applied to the insertion devices.

As the outer bearing shell device is designed with a closed, and one-piece bearing ring element, the pretensioning force is easily adjustable in the region of the bearing mechanisms, which in contrast to the pretensioning force applied via a bolted connection that is used for connecting separate outer bearing shells, that decreases to a lesser extent due to setting processes and the like. Furthermore, the closed bearing ring element also guarantees improved force flow. In contrast to outer bearing shells designed having two-parts, a relative shift between the two outer bearing shells is also prevented in a simple manner due to the closed annular shape of the bearing ring element.

In an advantageous further development of the bearing mechanism according to the invention, the tensioning elements are formed with it least one wedge-shaped region that can be disposed between the insertion devices and the transverse leaf spring and/or between the insertion devices and the bearing ring element. Thus, the pretensioning force necessary for operating the bearing mechanism can be adjusted during assembly in a simple manner, independent of manufacturing tolerances in the region of the bearing mechanism and also in the region of the transverse leaf spring, because possibly present manufacturing tolerances can be compensated by varying the insertion path of the tensioning elements between the insertion devices and the transverse leaf spring and/or between the insertion devices and the bearing ring element.

In an embodiment of the bearing mechanism according to the invention characterized by simple assembly and simple constructive design, at least one part of the tensioning elements for creating a tensioning element-side pretensioning force on the insertion devices and the transverse leaf spring can be operatively connected to the bearing ring element, and the pretensioning force can be supported on a shoulder of the bearing ring element.

In a further advantageous embodiment of the bearing mechanism according to the invention, the layer elements formed with the lower stiffness overlap the transverse leaf spring with stop regions in the assembled state in the longitudinal direction of the vehicle and in the vertical direction of the vehicle at least in sections, in order to be able to position the multi-part insertion devices during assembly in a simple manner with respect to the transverse leaf spring, and to be able to supply a soft support of the transverse leaf spring in the longitudinal direction of the vehicle in the region of the outer bearing shells in a constructively simple manner.

The stop regions can be designed in the contact regions facing the transverse leaf spring and/or in the contact regions facing the outer bearing shells, with projections and/or recesses oriented at least nearly in the longitudinal direction of the vehicle, in order to attain different bearing stiffnesses via the shift of the transverse leaf spring in the region of the bearing mechanism according to the invention, where the stop regions acting as a bearing stops can be designed differently ahead of and behind the transverse leaf spring in the longitudinal direction of the vehicle with respect to a front of the vehicle, in order to be able to represent correspondingly different bearing characteristics.

Further advantages and advantageous embodiments of the subject matter according to the invention arise from the patent claims and the example embodiments described in the following based on the drawings, where for the sake of clarity, in the description of the different example embodiments components that are the same or functionally equivalent are provided with the same reference numbers.

Features specified in the dependent claims as well as the features specified in the following example embodiments of the bearing mechanism according to the invention are suitable, alone or in any arbitrary combination of the subject matter according to the invention, to be further developed. The respective combinations of features with respect to the further development of the subject matter according to the invention do not represent limitations, but rather merely comprise examples.

BRIEF DESCRIPTION OF THE DRAWINGS

They show:

FIG. 32b a simplified side view of the top surface region shown in FIG. 32a.

DETAILED DESCRIPTION OF THE INVENTION

Figure 1:
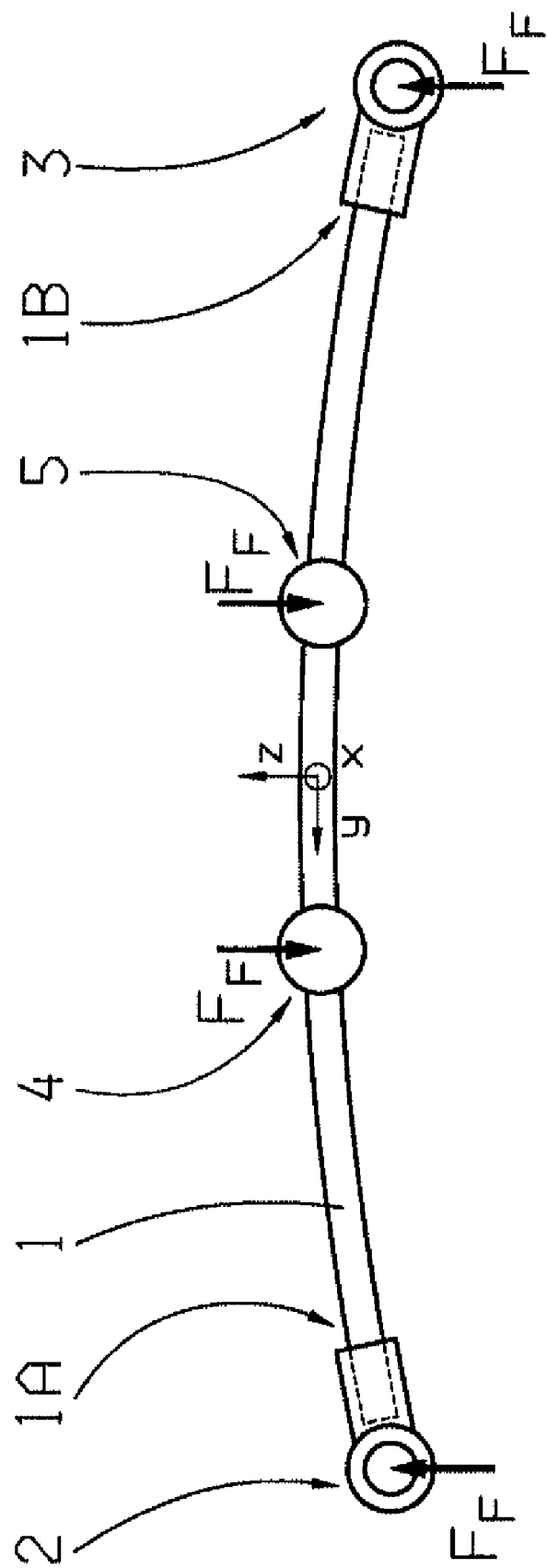
FIG. 1 a highly schematic representation of a transverse leaf spring having two outer guide bearings and two bearing mechanisms according to the invention, disposed in the center region of the transverse leaf spring.

FIG. 1 shows a highly schematic representation of a transverse leaf spring 1 that can be mounted in the region of a vehicle axle of a vehicle. The transverse leaf spring 1 is supported at the end regions 1A, 1B thereof facing toward wheels of the vehicle axle, in outer bearings 2, 3 or guide bearings, designed here as so-called bearing shoes, and connected to wheel carriers of the vehicle axle.

The transverse leaf spring 1 in the center region thereof is effectively connected, directly to a vehicle chassis or to an auxiliary frame connected in turn the vehicle chassis and supported thereon via bearing mechanisms 4, 5 acting as a central bearing. The bearing mechanisms 4 and 5 are disposed symmetrically about the center of the transverse leaf spring 1 and connect the mechanisms to the vehicle chassis in a manner described below, where rotations of the transverse leaf spring 1 in the region of the bearing mechanisms 4 and 5 are possible to the required extent during unidirectional and alternating spring actions such that different spring rates can be adjusted using the transverse leaf spring 1 with unidirectional and alternating deflections in the regions 1A and 1B.

The bearing mechanisms 4 and 5 have high bearing stiffness in the transverse direction of the vehicle, or respectively the y-direction, and during operation of a vehicle constructed with the transverse leaf spring 1 and the bearing mechanisms 4 and 5, deform only marginally in the y-direction, in order to take on wheel guiding tasks along with the described suspension function. The high bearing stiffness in the y-direction offers the additional possibility to avoid an overall shift of the transverse leaf spring 1 in the transverse direction of the vehicle, or respectively the y-direction, in a simple manner.

In order to create the frictional connection between the bearing mechanisms 4 and 5 and transverse leaf spring 1 necessary for the trouble-free function of the transverse leaf spring 1, the two bearing mechanisms 4 and 5 are also designed with a correspondingly high bearing stiffness in the vertical direction of the vehicle, or z-direction. Furthermore, due to the high bearing stiffness of the bearing mechanisms 4 and 5 in the vertical direction of the vehicle, the transverse leaf spring 1 does not have the shift of a rigid body in the region of the bearing mechanisms 4 and 5 during alternating deflection of the end regions 1A and 1B. During alternating deflection, the transverse leaf spring 1 is accordingly deformed in a targeted manner in a so-called S-stroke, and provides a higher alternating spring rate.

Figure 2:
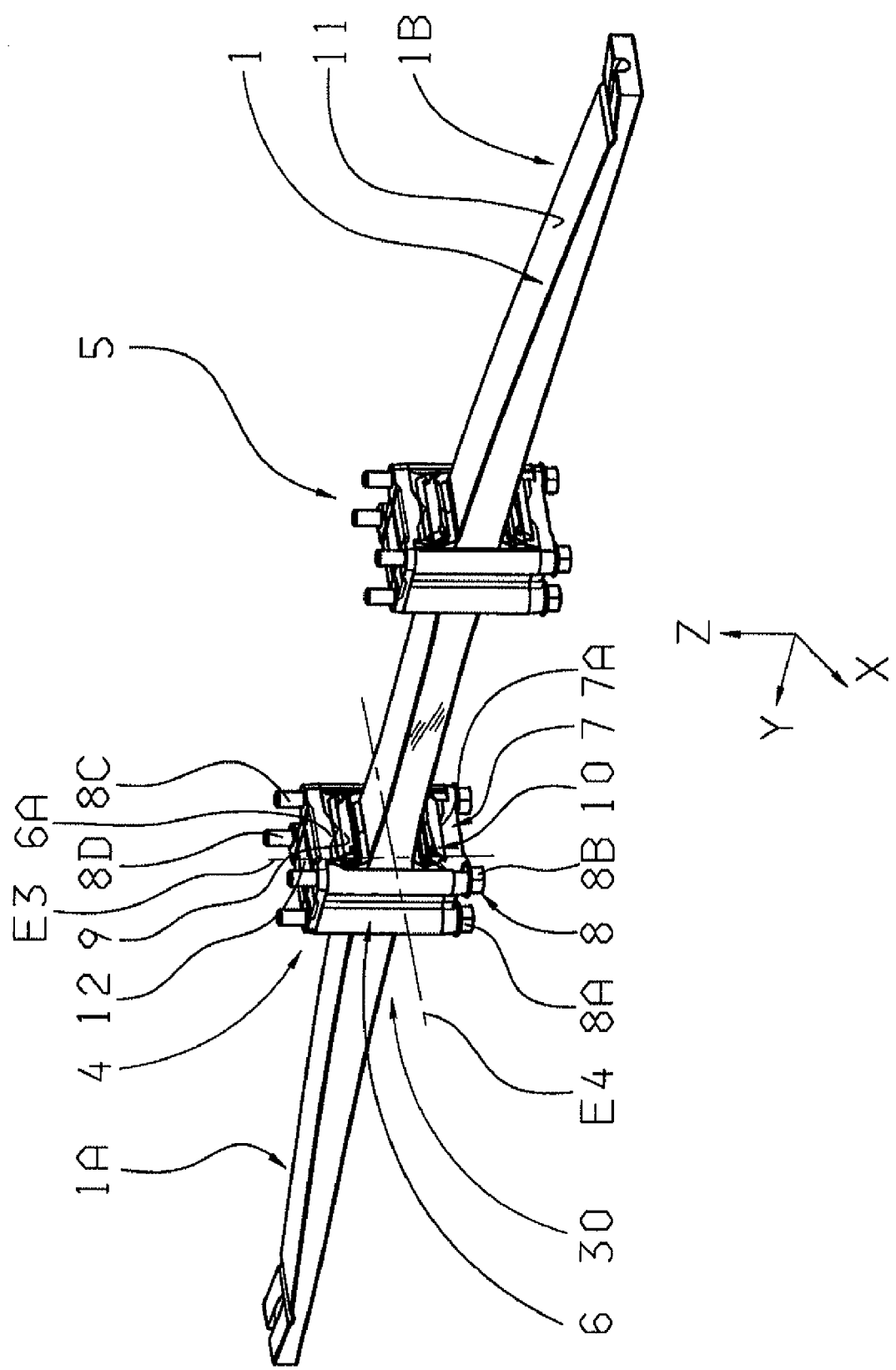
FIG. 2 a three-dimensional representation of a first embodiment of the bearing mechanism according to the invention that is disposed in a center region of a transverse leaf spring.

FIG. 2 shows a three-dimensional representation of the transverse leaf spring 1 designed as a beam-like spring element. The transverse leaf spring 1 is connected to and supported at a vehicle chassis, not shown in more detail, by the two bearing mechanisms 4, 5, and connected via the two end region bearing devices 2, 3 to the wheels of a vehicle axle of the vehicle, and supported in the end regions 1A, 1B. The so-called four point bearing allows both vertical suspension and roll suspension in the region of the transverse leaf spring 1, whereby conventional suspension springs and stabilizers known from the prior art are omitted. Along with the cited suspension functions, wheel guiding functions can also be provided by the transverse leaf spring 1 in a corresponding embodiment of the bearing mechanisms 4 and 5, and the end region bearings 2 and 3. Along with great cost savings potential, the present spring system also provides the possibility for weight reduction in the region of the vehicle axle due to appropriate selection of the material for producing the transverse leaf spring 1, for example fiber composite material.

Figure 3:
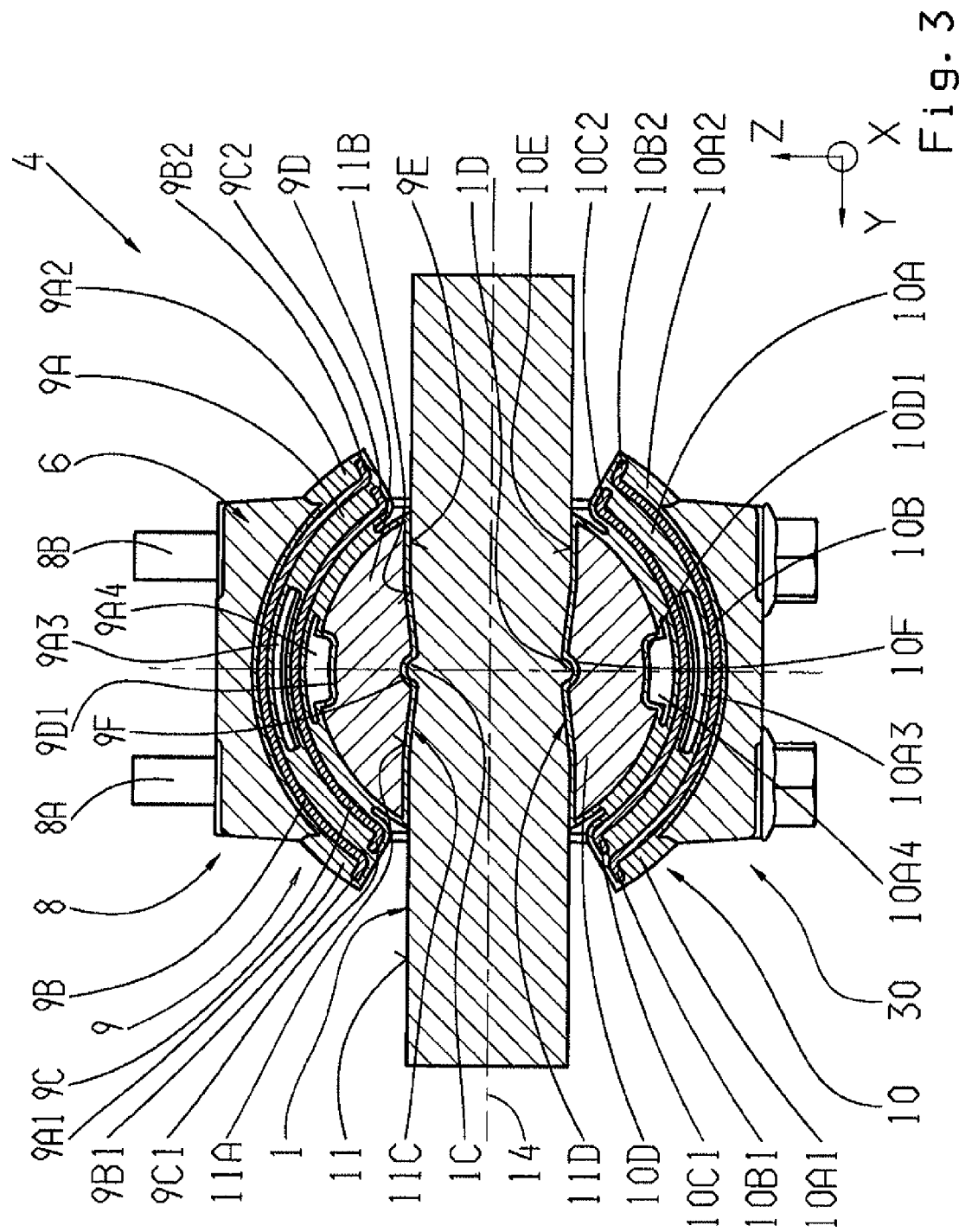
FIG. 3 the bearing mechanism according to FIG. 2 in a longitudinal sectional view along a longitudinal sectional plane E3 shown in more detail in FIG. 2.
Figure 4:
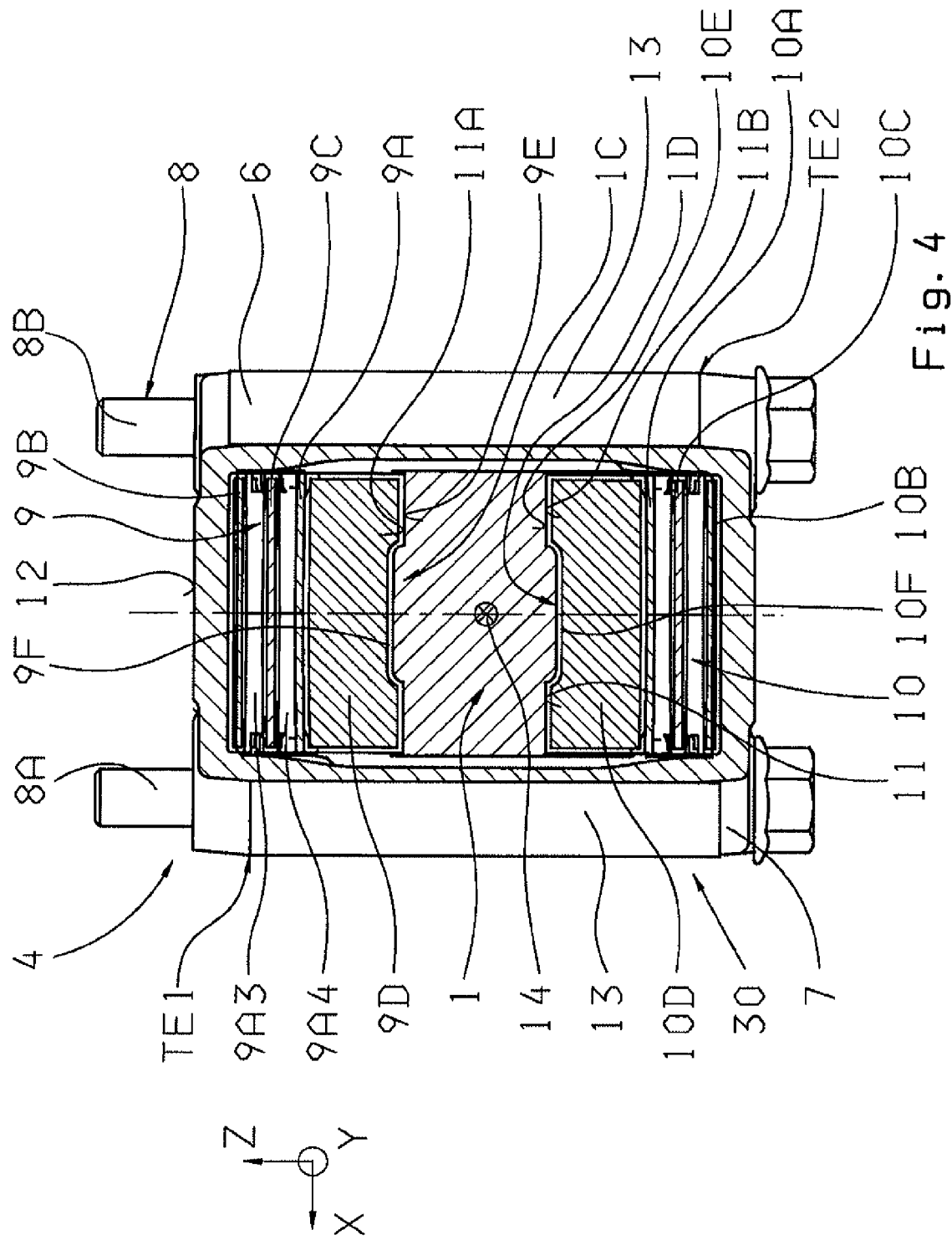
FIG. 4 the bearing mechanism according to FIG. 2 in a sectional view along the transverse sectional plane E4 shown in more detail in FIG. 2.
Figure 5:
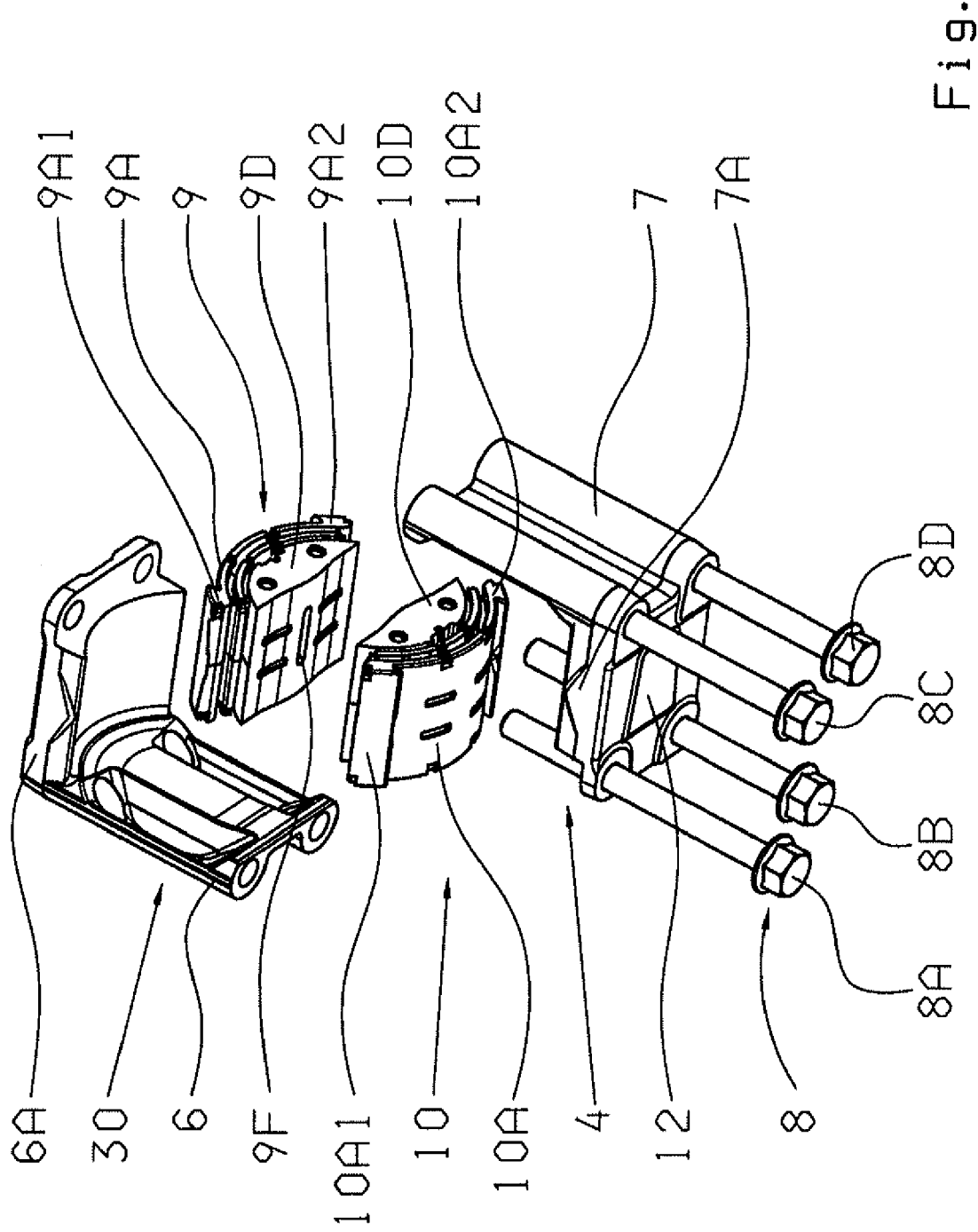
FIG. 5 the bearing mechanism according to FIG. 2 in a three-dimensional individual view in an exploded representation.

FIG. 3 shows a longitudinal view of the bearing mechanism 4 along sectional plane E3, graphically depicted in FIG. 2 only by a dash-dotted line, which corresponds to a so-called yz-sectional plane. FIG. 4 shows a cross-sectional view of the bearing mechanism 4 along a cross-sectional plane E4, likewise depicted as a dash-dotted line in FIG. 2, where the cross-sectional plane E4 corresponds substantially to a so-called xz-cross-sectional plane. FIG. 5 graphically portrays a three-dimensional exploded diagram of the bearing mechanism 4 in an individual view.

The bearing mechanisms 4 and 5 fundamentally comprise the same construction, which is why the following description for FIG. 2 to FIG. 6 mainly describes only the bearing mechanism 4.

The bearing mechanism 4 comprises an outer shell bearing device 30 having two outer bearing shells 6, 7 that can be connected together, which are presently connected together via a bolt device 8 comprising four bolt elements 8A to 8D, where by means of the bolt device-side connection a pretensioning force necessary for producing the frictional connection between the bearing mechanism 4 and the transverse leaf spring 1 can be applied to insertion devices 9, 10 disposed between the outer bearing shells 6 and 7. The bearing mechanism 4 can also be connected to the vehicle chassis, or the auxiliary frame, via the bolt device 8.

The outer bearing shells 6 and 7 are presently formed angled or L-shaped, and adjoin each other in the region of two separation planes TE1 and TE2. Additionally, the outer bearing shells 6 and 7, in the regions thereof overlapping the transverse leaf spring 1 in the vertical direction of the vehicle, are each formed with a web 13, by means of which movement of the insertion devices 9 and 10 is limited in the longitudinal direction of the vehicle, or in the x-direction.

Moreover, the outer bearing shells 6 and 7 can be designed to simplify assembly with centering devices that comprise alignment pins fitted into corresponding bore holes of the outer bearing shells 6 and 7, wherein the outer bearing shells 6 and 7 are centered to each other using tongue and groove implementations or the like depending on the application case and the discretion of the person skilled in the art.

Both the outer bearing shells 6 and 7 and the insertion devices 9 and 10 are formed identically, in order to keep the production costs of the bearing mechanism 4 as low as possible. The insertion devices 9 and 10 are formed here having three layer elements 9A to 9C, or 10A to 10C, and each having an insertion part 9D or 10D that is formed substantially semi-cylindrically. Here, the layer elements 9A and 10A of the insertion devices 9 and 10 are produced from a resilient material, which is applied during a vulcanization onto the metal layer elements 9B, 9C or 10B, 10C, and onto the insertion parts 9D and 10D that are presently similarly produced from metal, or which encompasses the layer elements 9B, 9C or 10B, 10C as well as the insertion parts 9D or 10D.

The insertion parts 9D and 10D can also be produced from plastic, fiber composite materials, natural materials, such as wood, stone and the like, as well as from different metal materials.

The layer elements 9B, 9C or 10B, 10C are designed with greater stiffness than the layer elements 9A or 10A, and between end regions 9B1, 9B2, 9C1, 9C2 or 10B1, 10B2, 10C1, 10C2 oriented in the axial direction of the transverse leaf spring 1 comprise regions formed substantially as convex, half-shell shaped hollow cylinders. The end regions 9B1, 9B2 or 10B1, 10B2 of the layer elements 9C or 10B are connected to the convex regions with respect to the surface 11 via concave curved regions, and face away from the surface 11 of the transverse leaf spring 1, whereby damage to the layer element-side of the surface 11 during large deflections of the transverse leaf spring 1 is avoided in a constructively simple manner. Damage to the surface 11 of the transverse leaf spring 1 is additionally further reduced by the layer element-side or rubbery-like coating of the layer elements 9B, 9C or 10B, 10C and the insertion parts 9D or 10D.

The protective coating regions of the layer elements 9A or 10A between the insertion parts 9D or 10D and the contact surfaces 11A, 11B of the transverse leaf spring 1 sufficiently protect the surface 11 of the transverse leaf spring 1 against damage during oscillating loads which impact the service life of the transverse leaf spring to an undesired extent.

In addition, the protective coating can prevent fine dirt particles from penetrating between the insertion parts 9D and 10D and the transverse leaf spring 1. Here it is also conceivable that the insertion parts 9D and 10D are bonded to the surface 11 of the transverse leaf spring 1 for preventing the penetration of dirt particles, where this can be designed in the embodiment with or also without the protective coating.

Furthermore, the vulcanization coating of the insertion parts 9D and 10D can compensate for manufacturing tolerances in the region of the form-locking between the bearing mechanism 4 of the transverse leaf spring 1, and a coefficient of friction between the insertion parts 9D and 10D and the transverse leaf spring 1 can be increased by suitable material selection and corresponding surface characteristics of the protective coating.

The insertion devices 9 and 10 are connected to the outer bearing shells 6 or 7 in a form-locking manner via bulge-like end regions 9A1, 9A2, or 10A1 10A2 of the layer elements 9A or 10A, whereby during assembly of the bearing mechanism 4 the insertion devices 9 and 10 are positioned in the y-direction with respect to the bearing shell 6 or the bearing shell 7. Additionally, the insertion devices 9 and 10 are positioned during assembly in the x-direction, or in the longitudinal direction of the vehicle, via centering regions 6A, 7A of the outer bearing shells 6 and 7, which in the assembled state of the bearing mechanism 4 engage in a form-locking manner into the bulge-like end regions 9A1, 9A2 or 10A1, 10A2 of the layer element 9A or 10A.

During assembly, the two outer bearing shells 6 and 7 are slipped onto the insertion devices 9 and 10 and are positioned in the outer bearing shells 6 and 7 through notches of the bulge-like end areas 9A1, 9A2 or 10A1, 10A2, into which the projections 6A, 7A of the outer bearing shells 6 and 7 engage.

The required bearing stiffnesses are adjusted via the integration of the metal layers, or layer elements 9B and 9C or 10B, 10C, in the resilient layer elements 9A and 10C. Additionally, there are cavities or recesses 9A3, 9A4 or 10A3, 10A4 in the regions of the layer elements 9A and 10A in order to adjust the bearing stiffness of the bearing mechanism 4 to the present requirements. The insertion parts 9D and 10D are each formed in regions with recesses 9D1 or 10D1 facing the layer elements 9C or 10C.

Furthermore, in the contact surfaces 9E and 10E that are facing the support surfaces 11A and 11B of the transverse leaf spring 1, the insertion devices 9 and 10 are formed each having at least one receiving device 9F or 10F, into which in the assembled state of the insertion devices 9 and 10 a region 1C or 1D of the transverse leaf spring 1 engages in a form-locking manner. Additionally, in the vertical direction of the vehicle, or z-direction, the transverse leaf spring 1 in the region of the support surfaces 11A and 11B, comprises recesses 11C, 11D each for the insertion devices 9 or 10, and into which the insertion devices 9 and 10 engage in a form-locking manner via correspondingly shaped insertion parts 9D and 10D, so that during operation of a vehicle relative movement of the transverse leaf spring 1 in the transverse direction of the vehicle, or in the y-direction with respect to the vehicle chassis, is avoided in a constructively simple manner and also via additional form-locking between the transverse leaf spring 1 and the bearing mechanism 4 in addition due to the force locking connection to the bearing mechanism 4.

The recesses 11O and 11D, or the contours of the recesses 11C and 11D, are formed such that during operation stress is distributed as uniformly as possible in a contact region of the bearing mechanism 4 at the transverse leaf spring 1 which favorably influences the service life of the transverse leaf spring 1. The contour of the recesses 11C and 11D each substantially correspond to a special cosinusoidal indentation in the y-direction, thereby attaining a stress distribution that is as uniform as possible in the bearing region of the transverse leaf spring 1. The outer bearing shells 6 and 7 are each formed having contact surfaces 12 to the vehicle chassis or for the auxiliary frame operatively connected to the vehicle chassis, in order to guarantee a direct as possible force flow between the bearing mechanism 4 and the vehicle chassis. However, departing therefrom, it is possible to form the bearing shells 6 and 7 differently at least in sections, in order to adapt the bearing mechanism 4 to the available construction spaces or to implement so-called poka-yoke requirements that effectively prevent incorrect assembly of the bearing mechanism 4.

Additionally, the position of the bearing mechanism 4 at the transverse leaf spring 1, which is essential for the overall function of the system, is also defined using the form-locking between the transverse leaf spring 1 and to bearing mechanism 4.

The present transverse leaf spring 1 is formed having a variable cross-section. In order to keep the portion of fibers in the cross section of the transverse leaf spring 1 as constant as possible, there exists the possibility that in the assembly region of the bearing mechanisms 4 and 5 in the longitudinal direction of the vehicle, the transverse leaf spring 1 is designed with a slightly broader cross-section than in comparison to the remaining cross-section. Alternatively, it is possible that the transverse leaf spring 1 is formed with a constant cross-section over the entire length.

The transverse leaf spring 1, in the region of the surface 11 thereof, is designed at least in the contact region to the bearing mechanisms 4 and 5 having a special surface coating and/or surface treatment, in order to increase the hardness of the surface 11 of the transverse leaf spring 1 with respect to the remaining surface 11, and/or to increase the coefficient of friction for increasing the connection forces in the region of the form-locking between the transverse leaf spring 1 and the bearing mechanism 4 and 5. Additionally it is possible to use a special surface coating and/or surface treatment of the surface 11 of the transverse leaf spring 1 in order to facilitate or simplify the manufacturing process for producing the regions 1C and 1D of the transverse leaf spring 1, for instance the process of demolding the transverse leaf spring 1 from the tool.

For example, an adhesive layer, a varnish layer, a plastic material and a plastic layer implemented with nanoparticles, are conceivable as a surface coating. During a surface treatment, the surface 11 of the transverse leaf spring 1 is pretreated with a fluid increasing the adhesion property of the surface for example, and then particles increasing the hardness or the coefficient of friction are applied onto the surface of the transverse leaf spring in the cited region, for example by vapor deposition.

The bearing mechanism 4 is pretensioned by the four bolt elements 8A to 8D, where high bearing stiffnesses in both the z-direction and y-direction with simultaneously low torsion stiffness about the longitudinal axis of the vehicle can be made available by means of the form-locking and force locking connection between the bearing mechanism 4 and the transverse leaf spring 1. During the assembly of the bearing mechanism 4, the insertion devices 9 and 10 are placed onto the top side and bottom side of the transverse leaf spring 1, and centered on the transverse leaf spring 1 in the transverse direction of the vehicle, or in the y-direction, by the regions 1C and 1D of the transverse leaf spring 1 engaging into the insertion devices 9 and 10, whereby precise fixing of the bearing mechanism 4 on the transverse leaf spring 1 is guaranteed.

The center of rotation of the two insertion devices 9 and 10 in the assembled state of the bearing mechanism 4 and 5 lies substantially on the neutral fiber of the transverse leaf spring 1, whereby deformations in the region of the insertion devices 9 and 10 are advantageously of substantially uniform extent. The recesses 11C and 11D of the transverse leaf spring 1, which are preferably cosinusoidal the transverse direction of the vehicle, provide a form-locking connection of the bearing mechanism 4 to the transverse leaf spring 1, where the cosinusoidal form, or the cosinusoidal transition between the surface 11 of the transverse leaf spring 1 outside of the recesses 11C and 11D and the support surfaces 11A and 11B in the region of the recesses 11C and 11D guarantees a transition that is as smooth as possible in the progression of the individual fibers of the transverse leaf spring 1 produced from composite material. The smooth transition in the progression of fibers of the transverse leaf spring 1 prevents adverse influence to the service life of the transverse leaf spring 1 in a simple manner.

The outer bearing shells 6 and 7 in the example embodiment of the bearing mechanism 4 shown in FIG. 2 to FIG. 5 are designed as cast iron components that in the assembled state comprise two separation planes.

Figure 6:
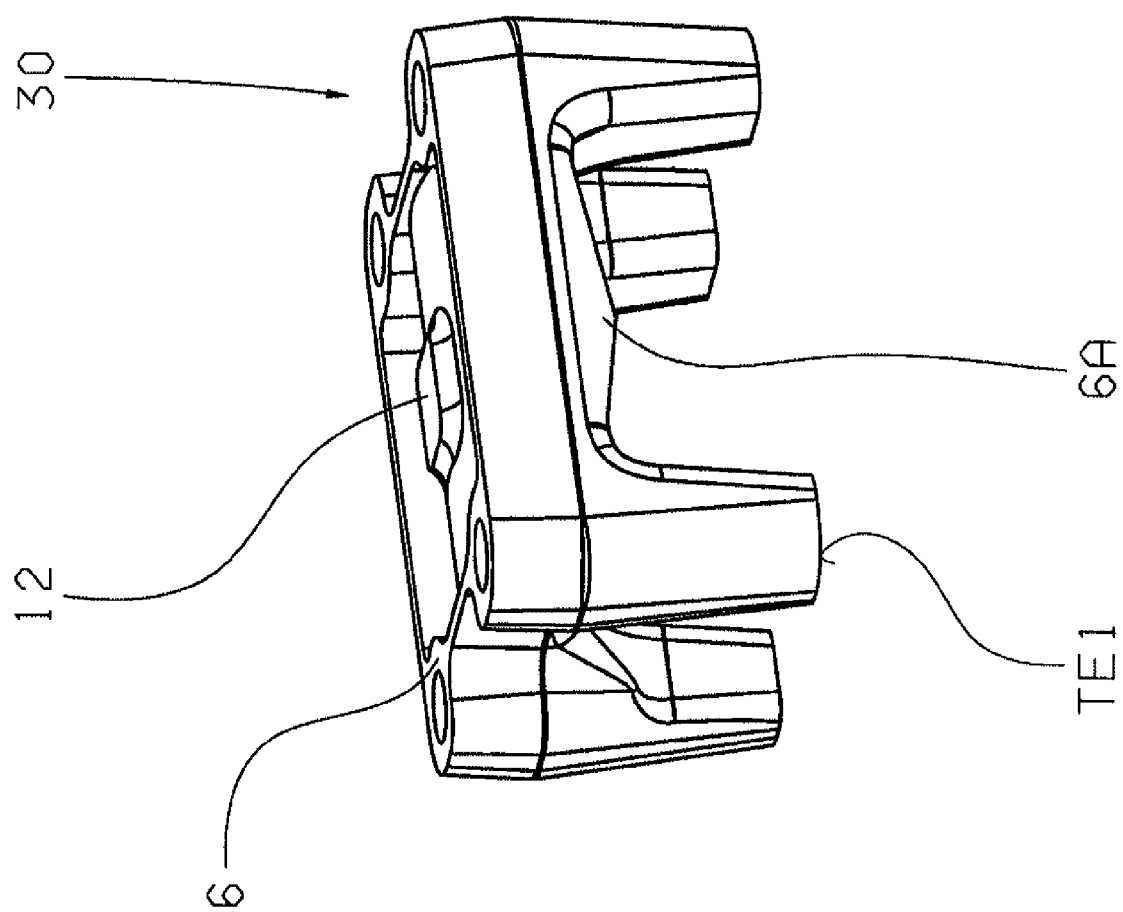
FIG. 6 an alternate embodiment of an outer bearing shell of the bearing mechanism according to FIG. 2.

In an alternative embodiment, the outer bearing shells 6 and 7 shown in FIG. 6 comprise a substantially U-shaped cross-section. The outer bearing shell 6 or 7 according to FIG. 6 is also designed as a cast iron component, and in the region of a separation plane abuts the respective other outer bearing shell 7 or 6. The upper and lower side of the outer bearing shells 6 and 7 can each be processed during a production step.

Depending on the respective application case, it is also possible that the outer bearing shells are produced from steel, aluminum or another suitable material. Furthermore, the outer bearing shells can also be implemented as a cold extrusion part.

Figure 7:
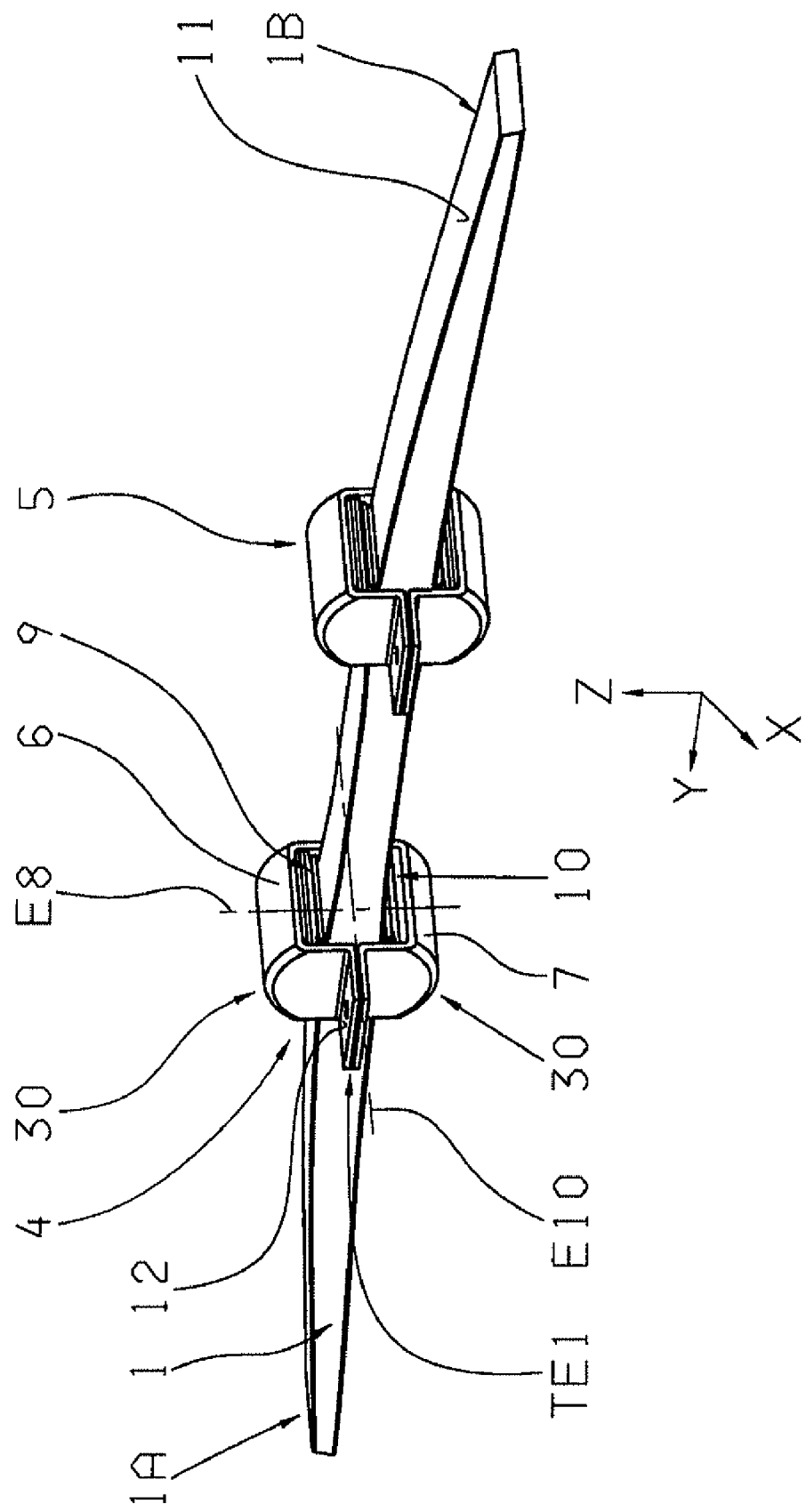
FIG. 7 a representation of a transverse leaf spring, corresponding to FIG. 2, that is supported at a vehicle chassis by means of a second embodiment of the bearing mechanism according to the invention.

FIG. 7 shows a representation of the transverse leaf spring 1 corresponding to FIG. 2, that is connected to the vehicle chassis via a second embodiment of the bearing mechanisms 4 and 5. The bearing mechanisms 4 and 5 basically have the same structure, which is why the following description references only the bearing mechanism 4.

The outer bearing shells 6 and 7 are formed as sheet metal shells that can be connected to the auxiliary frame or directly to the vehicle chassis. Departing from this, the outer bearing shells can also be designed as cast parts or as cold mass forming parts.

The outer bearing shells 6 and 7 have a symmetrical shape to reduce production costs. In the previously described manner, the outer bearing shells 6 and 7 comprise the insertion devices 9 and 10 that are each formed from multiple parts and comprise one element implemented elastically at least in sections, which is shown in more detail in each of the sectional representations 8 to 10 or 11 and 12.

Figure 8:
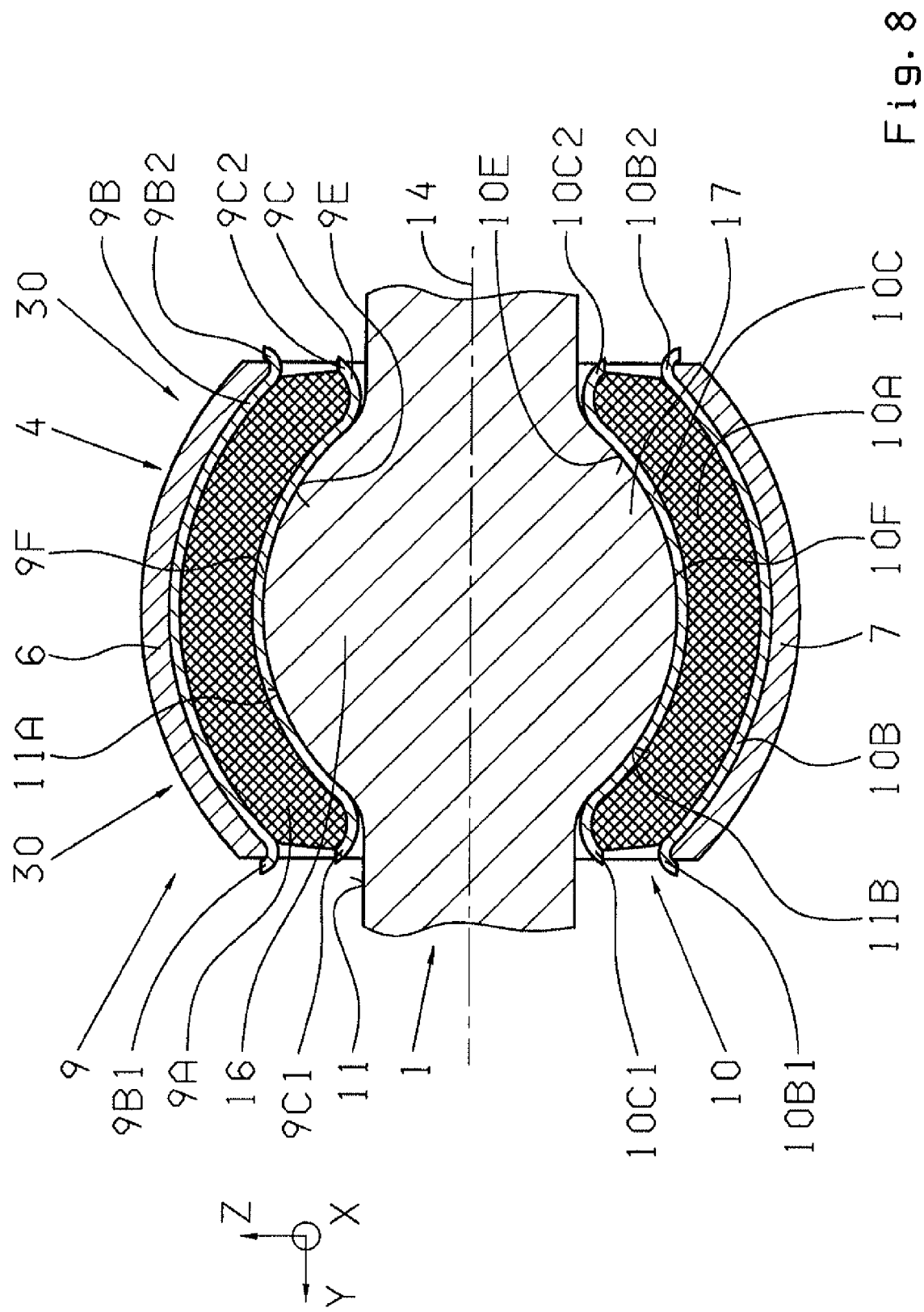
FIG. 8 a longitudinal sectional view of the bearing mechanism according to FIG. 7 along a sectional plane E8 shown in more detail in FIG. 7.
Figure 9:
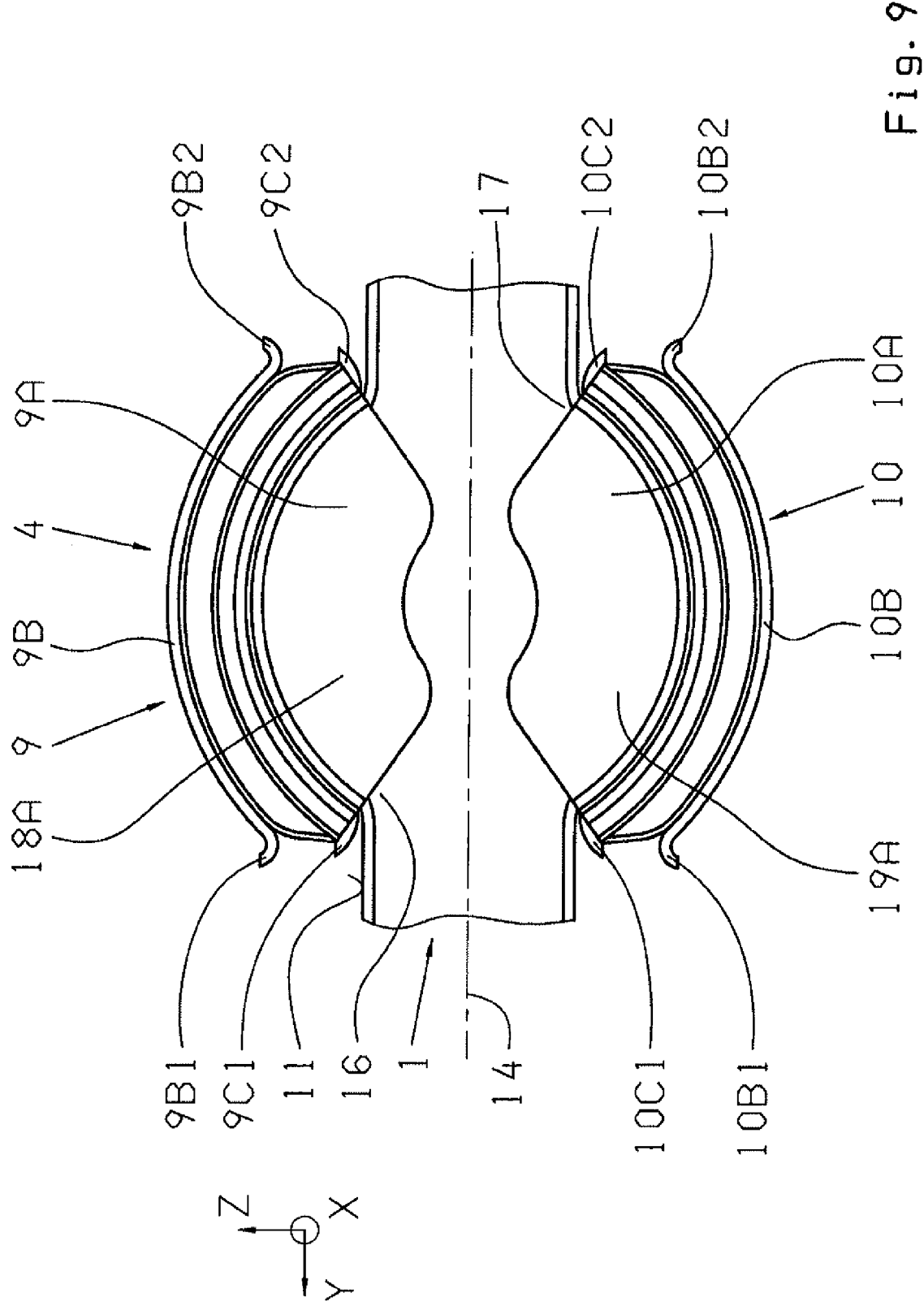
FIG. 9 a side view of the bearing device according to FIG. 7.
Figure 10:
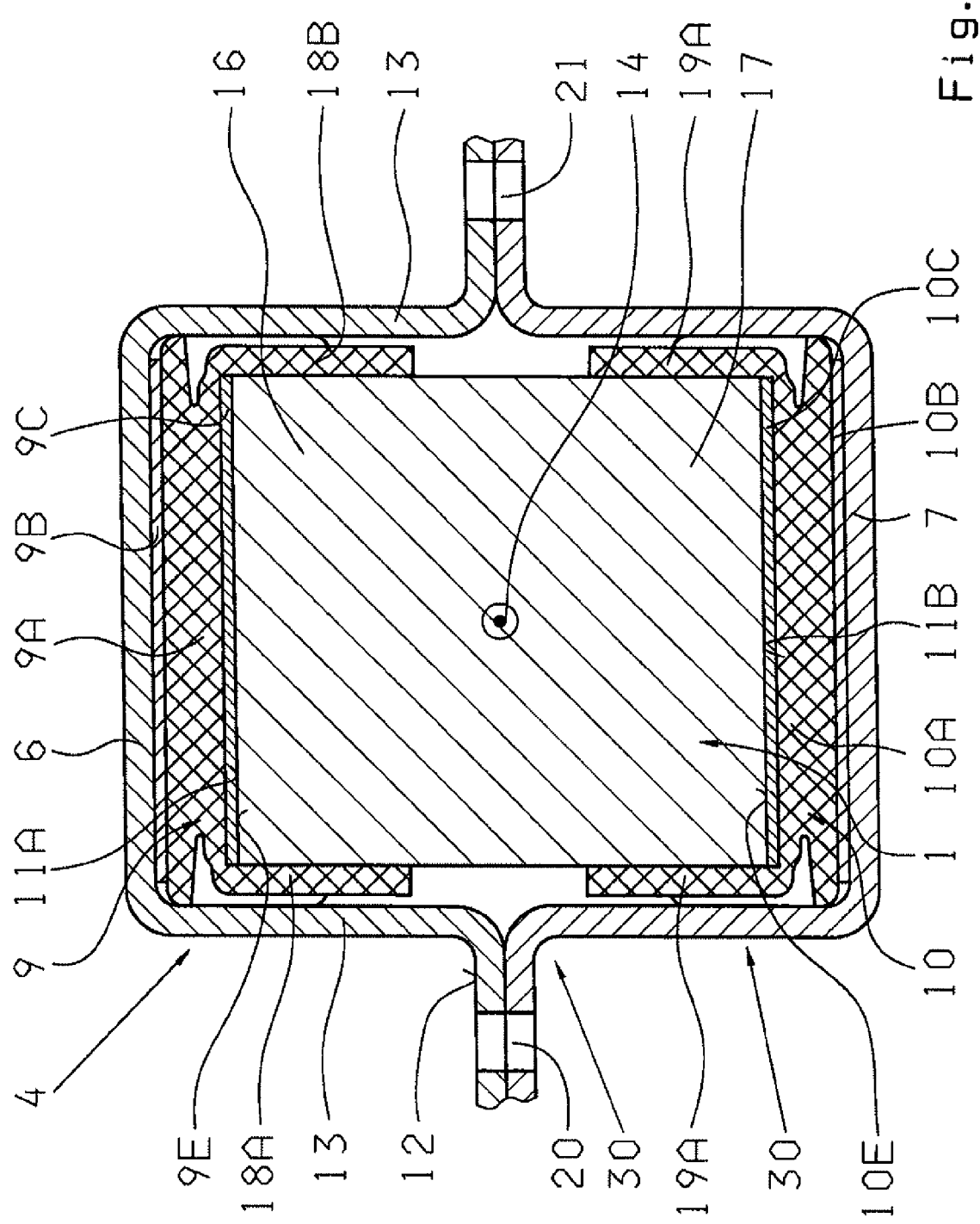
FIG. 10 a cross-sectional view of the bearing mechanism according to FIG. 7 along a sectional plane E10 shown in more detail in FIG. 7.

In the example embodiment of the transverse leaf spring 1 represented in FIG. 8 to FIG. 10, the transverse leaf spring comprises elevations 16, 17 in each of the contact regions of the bearing mechanism 4 at the transverse leaf spring 1, onto which the insertion devices 9 and 10 are placed with the layer elements 9A to 9C or 10A to 10C. The elevations 16 and 17 substantially take on the function of the insertion parts 9D or 10D of the insertion devices 9 and 10 according to FIG. 2 to FIG. 5.

In order to be able to adjust the bearing mechanism 4 to the desired bearing stiffness, the insertion devices 9 and 10, differing from the embodiment represented in FIG. 8 to FIG. 10, can be formed with additional layer elements increasing the stiffness and formed as an insertion metal sheets, or with recesses in the region of the layer elements 9A or 10A.

The layer elements 9C or 10C of the insertion devices 9 and 10, in the example embodiment represented in FIG. 8 to FIG. 10, are disposed between the resilient layer elements 9A or 10A and the transverse leaf spring 1 and, depending on the respective application case, can be produced from metal, plastic, reinforced plastic or fiber reinforced plastic. The layer elements 9C and 10C are connected by vulcanization to each of the resilient layer elements 9A and 10A, where depending on the application case one of the layer elements 9B, 9C, or 10B, 10C can be omitted.

The layer element disposed directly on the transverse leaf spring 1 must be designed such that the surface 11 of the transverse leaf spring 1 is not damaged by the layer element during operation. For this reason, the layer elements 9B, 9C and 10B, 10C in the end regions 9B1, 9B2, 9C1, 9C2, 10B1, 10B2, 10C1, 10C2 thereof are designed with ends that are rounded and bent toward the outside with respect to the surface 11 of the transverse leaf spring 1, where the curved or bent up ends 9B1, 9B2 and 10B1, 10B2 of the layer elements 9B and 10B have a centering or positioning function of the insertion devices 9 and 10 with respect to the outer bearing shells 6 and 7, and stop or prevent slipping of the insertion devices 9 and 10 with respect to the outer bearing shells 6 and 7 during extreme bearing loads.

FIG. 9 shows a side view of the transverse leaf spring 1 and the bearing mechanism 4 without the outer bearing shells 6 and 7. The representation according to FIG. 9 highlights that the resilient layer elements 9A and 10A are each formed with laterally disposed elastic stop regions 18, 19 that in the assembled state of the bearing mechanism 4 are disposed between the lateral surfaces of the transverse leaf spring 1 extending in a vertical direction z of the vehicle, and the outer bearing shells 6 and 7. The insertion devices 9 and 10 are positioned in the longitudinal direction x of the vehicle, via the stop regions 18 and 19, and offer a soft support of the transverse leaf spring 1 at the outer bearing shells 6 and 7 in the x-direction or the longitudinal direction of the vehicle.

In contact regions facing the transverse leaf spring 1 and/or in the contact regions facing the outer bearing shells, the stop regions 18 and 19 can be formed having projections and/or recesses oriented at least approximately in the longitudinal direction of the vehicle, in order to represent different bearing stiffnesses of the bearing mechanism 4 via the bearing shift. Additionally, the stop regions of the insertion devices 9 and 10 can be designed differently in front and in the back with respect to the longitudinal direction of the vehicle, in order to be able to represent correspondingly different bearing characteristics.

FIG. 10 represents the stop regions 18A, 18B and 19A, 19B of the insertion devices 9 and 10 on both sides of the transverse leaf spring 1 in the longitudinal direction of the vehicle. The outer bearing shells 6 and 7 are connected together in the region of bore holes 20, 21 by means of the bolt device 8 not represented in more detail in FIG. 10, via at least two bolt elements, and can be fastened additionally to the vehicle chassis or to an auxiliary frame.

Figure 11:
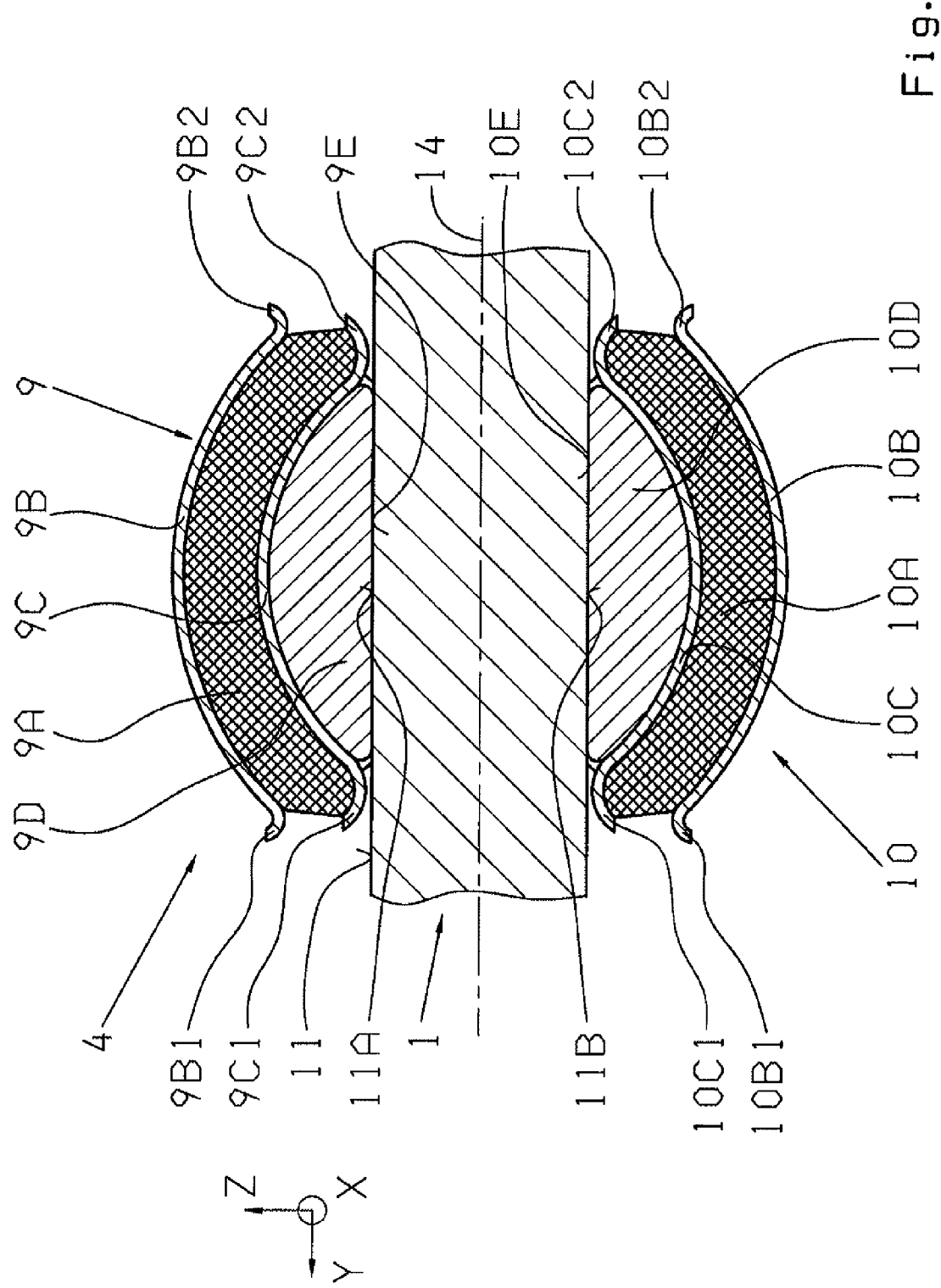
FIG. 11 a representation according to FIG. 8 of a second embodiment of the bearing mechanism depicted in FIG. 7.
Figure 12:
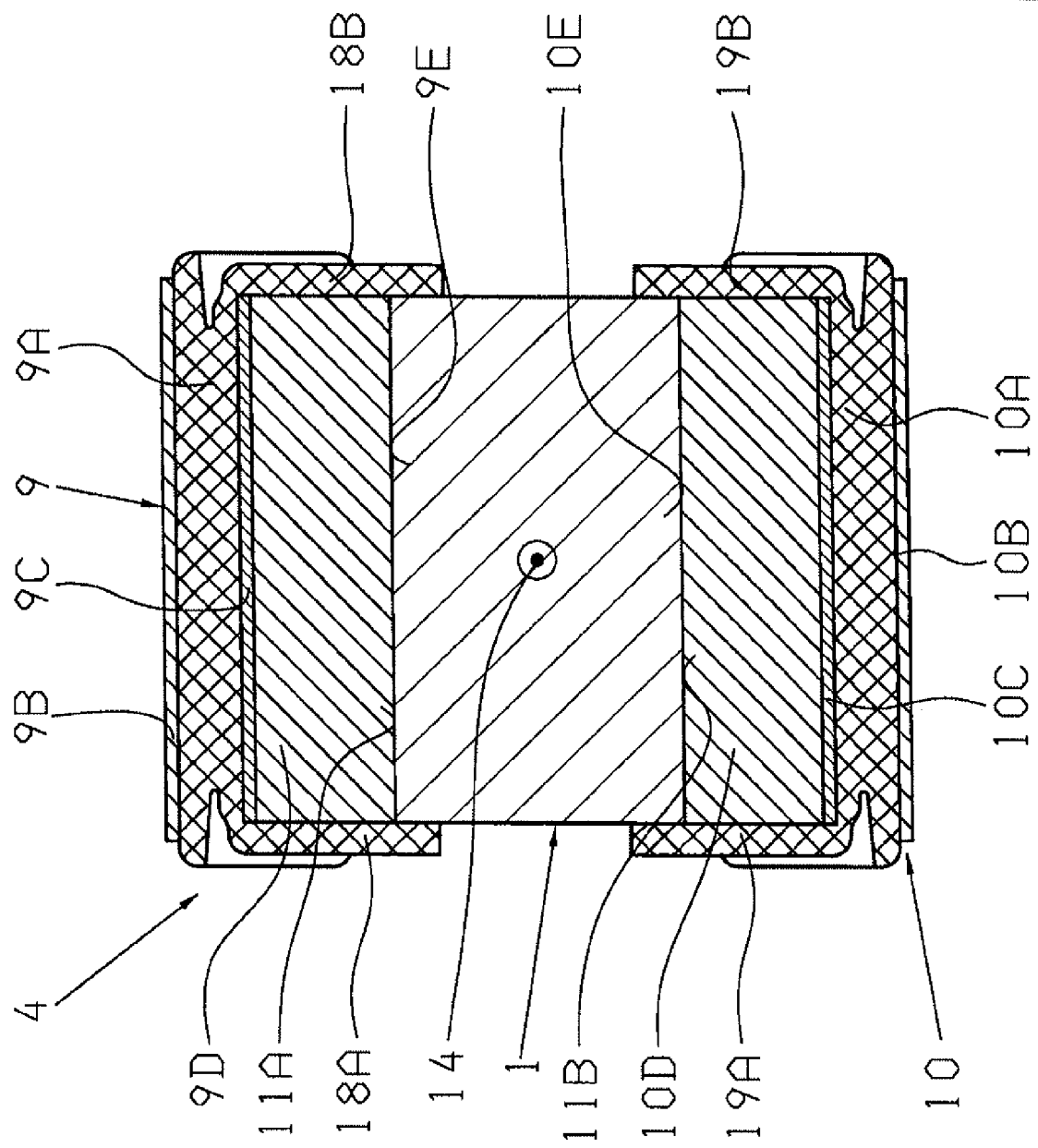
FIG. 12 a view according to FIG. 10 of the bearing mechanism according to FIG. 11.

FIG. 11 and FIG. 12 show a further example embodiment of the transverse leaf spring 1 and the bearing mechanism 4 or 5, in which the transverse leaf spring 1 is formed without the elevations 16 and 17 of the transverse leaf spring 1 in the contact region of the layer device 4 according to FIG. 8 to FIG. 10, and the insertion devices 9 and 10 are again designed with insertion parts 9D and 10D. The insertion parts 9D and 10D transfer the force from the transverse leaf spring 1 to the multi-part insertion devices 9 and 10 that are resilient at least in sections, which in turn introduce the acting forces into the outer bearing shells 6 and 7.

The insertion parts 9D and 10D in the bearing mechanism 4 according to FIG. 11 and FIG. 12 are each disposed between the surface 11 of the transverse leaf spring and the layer elements 9C or 10C. The further design of the insertion devices 9 and 10 corresponds substantially to the design of the insertion devices 9 and 10 according to FIG. 8 to FIG. 10.

Depending on the application case, the insertion parts 9D and 10D of the insertion devices 9 and 10 can be connected to the resilient layer elements 9A or 10A, by vulcanization for example, in order to simplify assembly of the bearing mechanism 4, and to possibly provide a resilient coating of the insertion parts 9D and 10D which in a simple manner prevents or reduces damage to the surface 11 of the transverse leaf spring 1 during operation.

Figure 13:
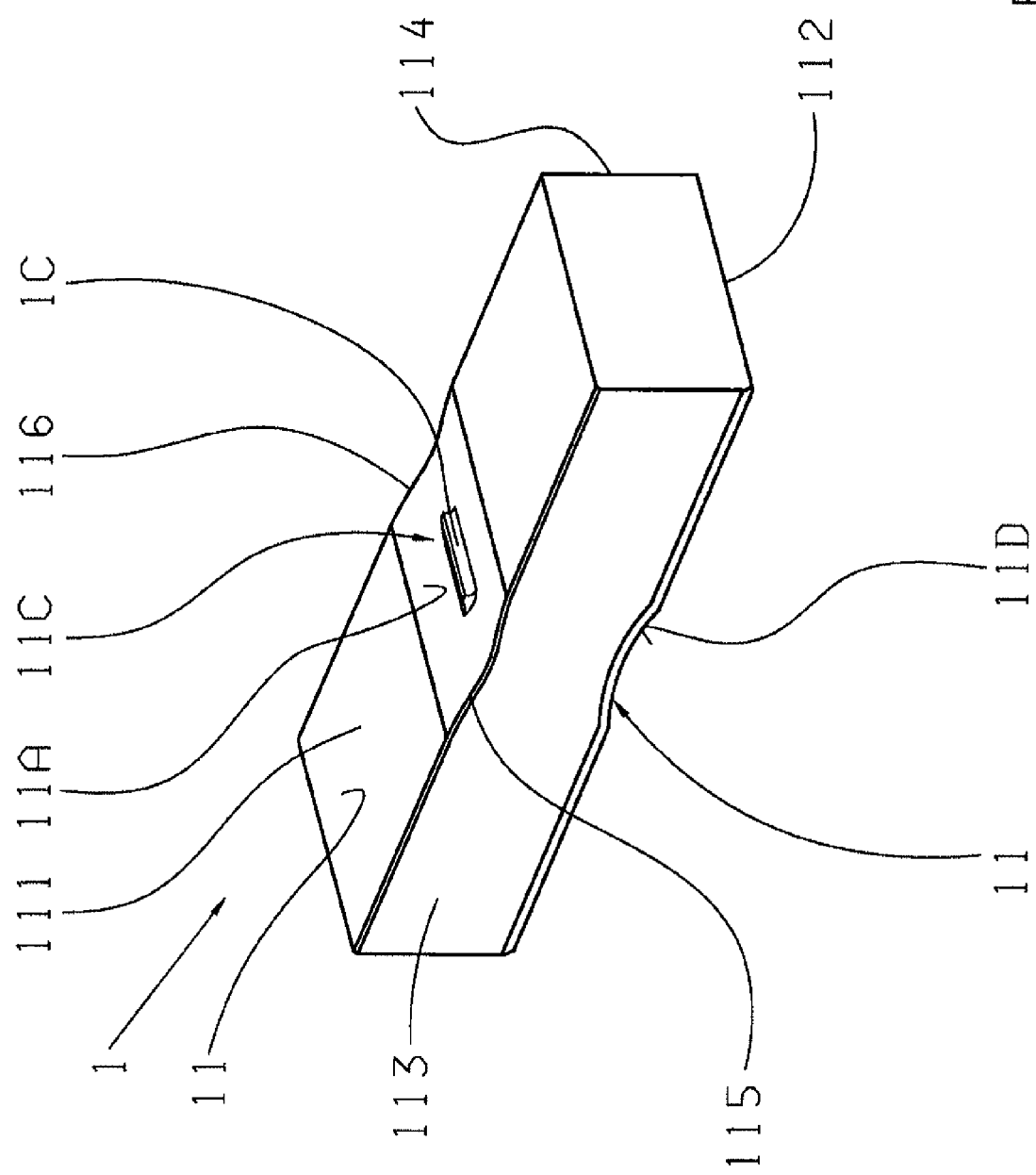
FIG. 13 to FIG. 21 each, a partial view of different embodiments of the transverse leaf spring in an assembly region of the bearing mechanism according to the invention.

FIG. 13 to FIG. 21 show embodiments of the regions of the transverse leaf spring 1 producing the form-locking between transverse leaf spring 1 and the bearing mechanism 4. The embodiments represented in FIG. 13 to FIG. 21 differ only in partial regions, which is why in the following description only the differences between the individual embodiment are described, and the description of FIG. 13 is referenced regarding the further functionality of the recesses.

In the embodiment represented in FIG. 13, the transverse leaf spring 1 is strongly compressed in the vertical direction of the vehicle, or in the z-direction, and formed with the same width as in the remaining cross-sectional region of the transverse leaf spring 1. Thereby the compressed region, or the region of the recesses 11C and 11D of the transverse leaf spring 1, have an increased portion of fibers. Due to the recesses 11C and 11D, increased transverse forces acting in the region of the bearing mechanism 4 can be reliably introduced from the transverse leaf spring 1 into the bearing mechanism 4. The transition between the recesses 11C and 11D and the adjacent surface 11 of the transverse leaf spring 1 is formed optimized for stress via a cosine contour having tangential starting and ending shapes so that during operation only minor stress increases occur in the region of the recesses 11C and 11D.

The regions 1C and 1D of the transverse leaf spring 1 substantially take on the task of centering the bearing mechanism 4 on the transverse leaf spring 1 in the longitudinal and transverse direction, while the regions 1C and 1D are mainly not involved, or only to a small extent, in the transmission of force between the bearing mechanism 4 and the transverse leaf spring 1. The shapes of the regions 1C and 1D are each designed with smooth transitions to the recesses 11C and 11D, where mainly resin accumulates in the regions 1C and 1D during production of the transverse leaf spring. Due to this manner of processing, an abrupt redirection of the fiber in the cross-section of the transverse leaf spring 1 is avoided.

In the assembled state of the transverse leaf spring 1, the recesses 11C and 11D are each bounded, in the longitudinal direction x of the vehicle, by edge regions 115 and 116 of the top side 111 and the bottom side 112, formed between a top side 111 and a bottom side 112 and lateral surfaces 113, 114 of the transverse leaf spring 1, where in the region of the edge regions the thickness of the transverse leaf spring 1 preferably corresponds substantially to the thickness outside of the recesses 11C and 11D. As a result of this contour only a minimal stress increase arises in the transition between the bearing location of the transverse leaf spring 1 and the remainder of the surface 11 of the transverse leaf spring 1 surrounding the bearing location. The width of the transverse leaf spring 1 remains substantially uniform, whereby in the cross section of the transverse leaf spring an increased portion of fibers is present in each of the regions of the recesses 11C and 11D.

Due to these recesses 11C and 11D each represented by an indentation, increased transverse and longitudinal forces can be easily transferred from the bearing mechanism 4 into the transverse leaf spring 1. During assembly of the bearing mechanism 4, the insertion devices 9 and 10 are centered on the transverse leaf spring 1 in both the longitudinal and transverse direction of the vehicle by means of the recesses 11C and 11D.

Figure 14:
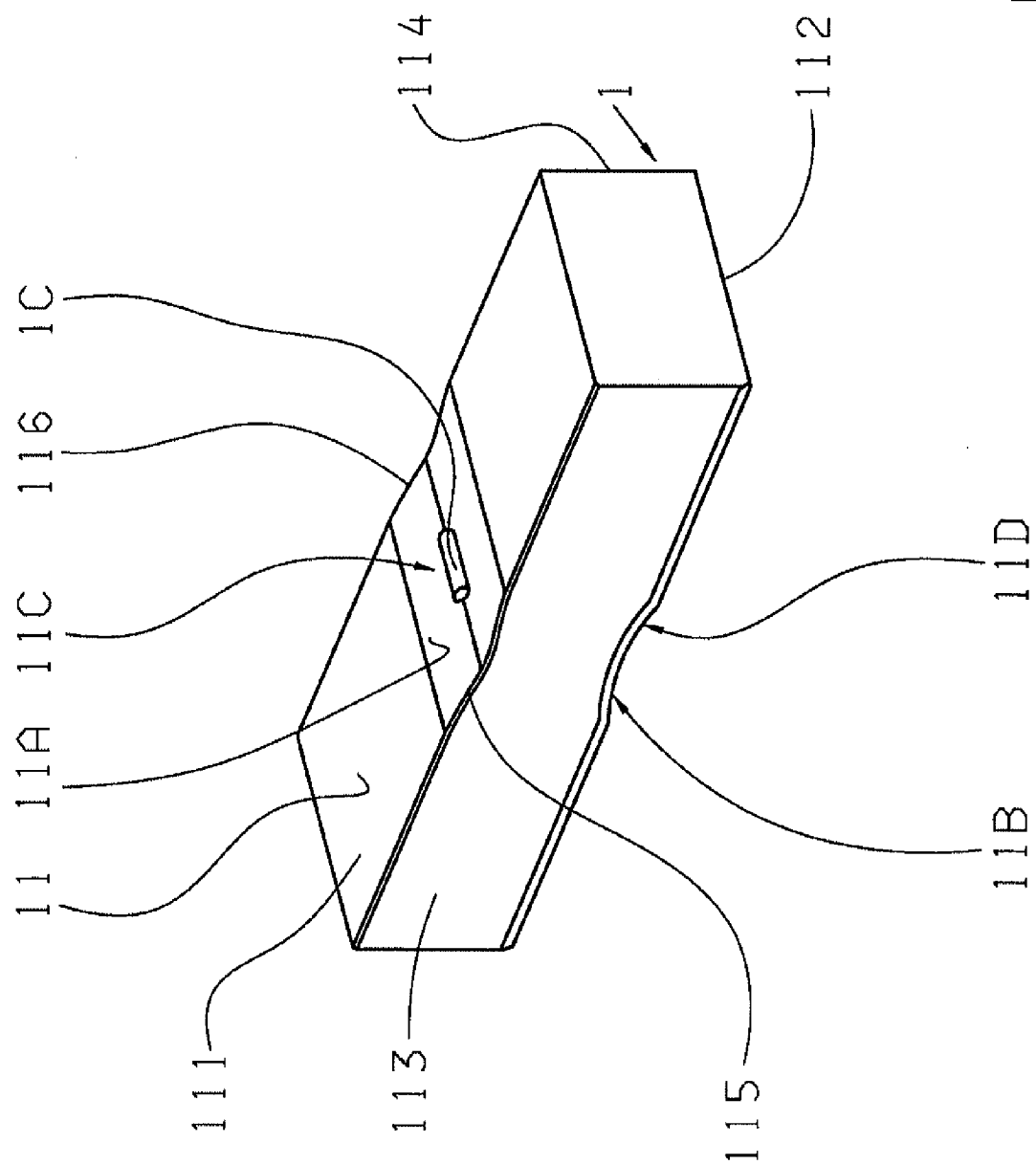

In the embodiment of the transverse leaf spring 1 represented in FIG. 14, the regions 1C and 1D are designed with a transition to the recesses 11C and 11D that is less smooth, and having an outer shape that is substantially nearly semi-cylindrical. Compared to the shape of the regions 1C and 1D represented in FIG. 13, the semi-cylindrical outer shape facilitates a simpler production of the tool which is used for manufacturing the transverse leaf spring 1. The regions 1C and 1D of the example embodiment of the transverse leaf spring 1 represented in FIG. 14, substantially take on only the centering of the bearing mechanism 4 at the transverse leaf spring 1 in the longitudinal and transverse direction, and are not involved, or only minimally involved, in the transmission of forces between the bearing mechanism 4 and the transverse leaf spring 1. The shapes of the regions 1C and 1D are designed such that the fibers of the transverse leaf spring 1 do not have any substantial redirection, and that the stiffness of the transverse leaf spring 1 corresponds to the stiffness of transverse leaf springs designed without the regions 1C and 1D.

Figure 15:
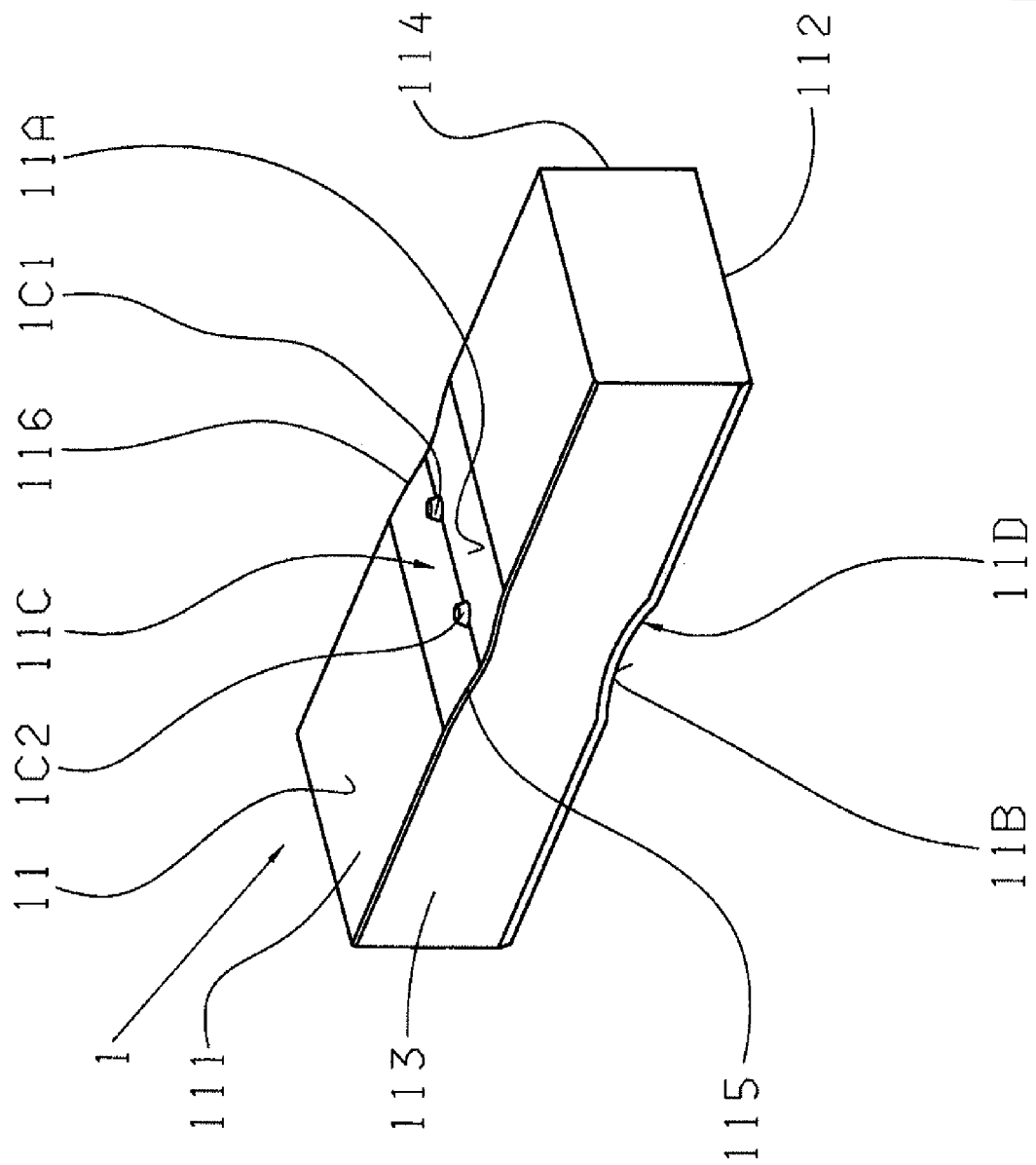

In the example embodiment of the regions 1C and 1D shown in FIG. 15, these regions are formed having two noses designed at least approximately in the shape of a truncated cone, disposed in the regions of the outer sides of the transverse leaf spring, and using these noses the bearing mechanism 4 is centered on the transverse leaf spring 1. The regions 1C and 1D again essentially accumulate resin in order to prevent abrupt redirection of the fibers in the region of the recesses or the regions 10 and 1D.

Figure 16:
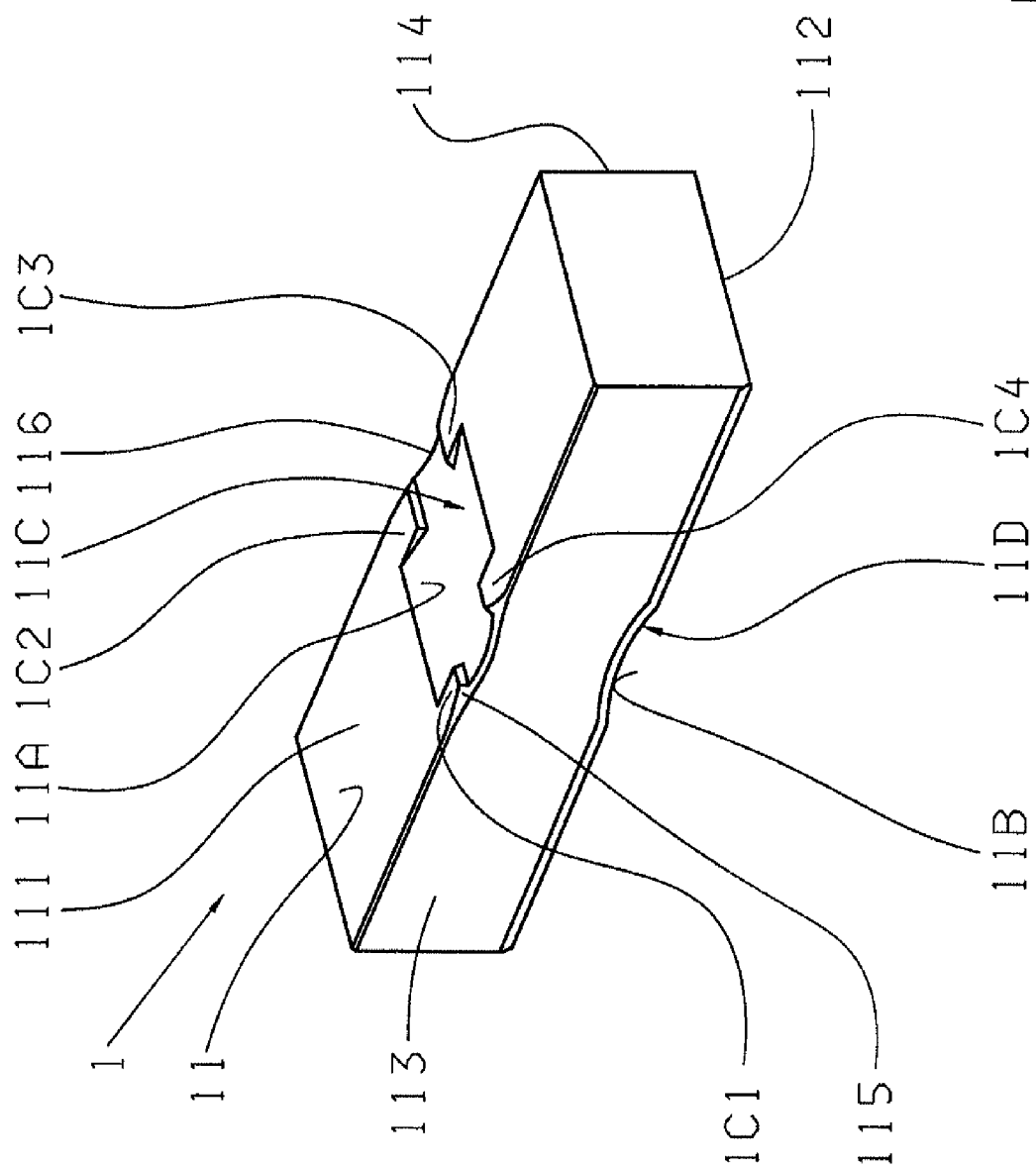
Figure 17:
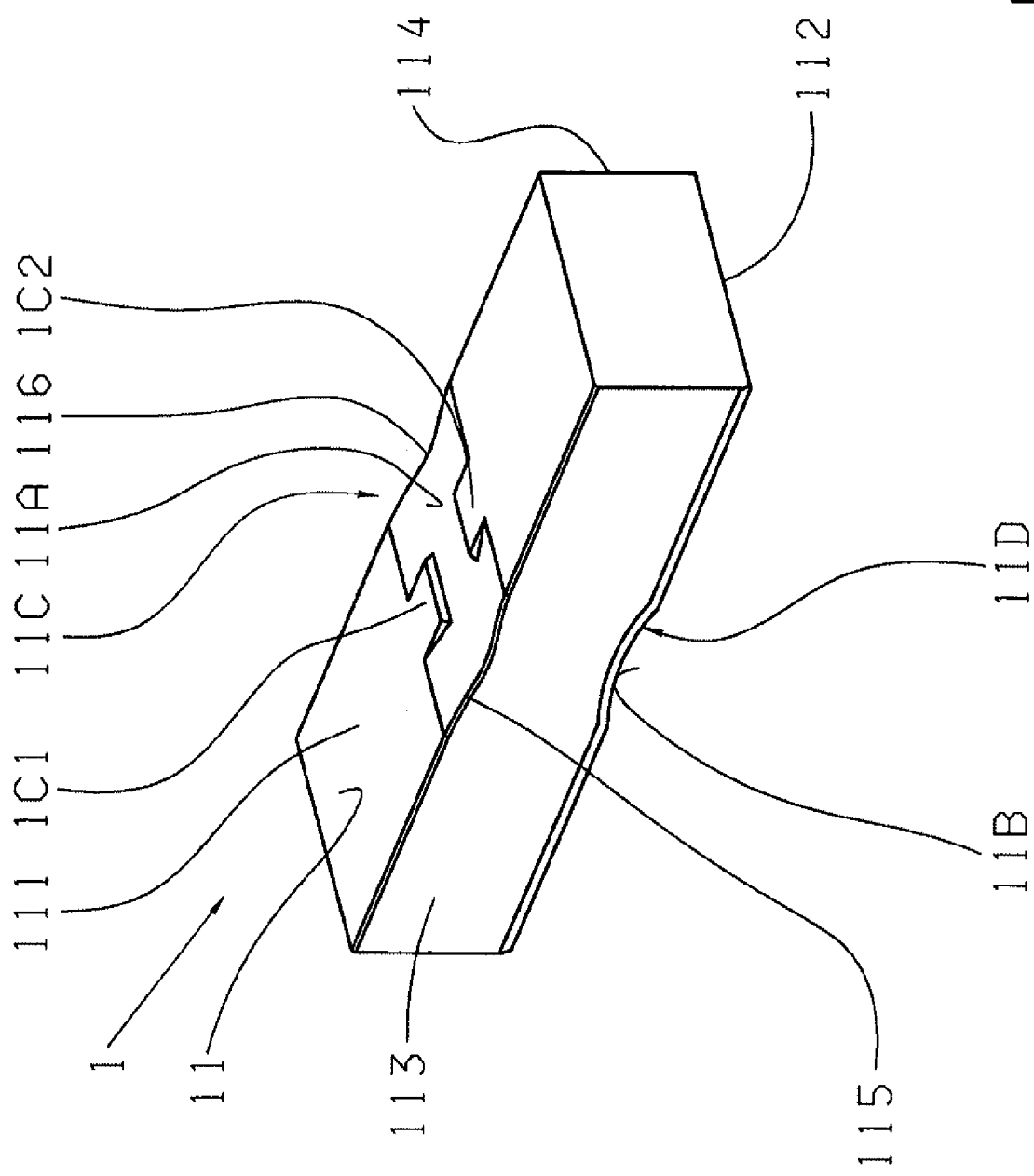

In the further example embodiment of the transverse leaf spring 1 according to FIG. 16, the regions 10 and 1D are formed as noses 1C1 to 1C4, disposed in the region of the outer sides of the transverse leaf spring 1, where the transitions between the recesses 11C and 11D and the noses 1C1 to 1C4 are formed again optimized for stress. In the example embodiment of the transverse leaf spring 1 according to FIG. 17, the regions 1C and 1D are formed with noses 1C1 and 1C2 disposed in the center region of the transverse leaf spring 1.

Figure 18:
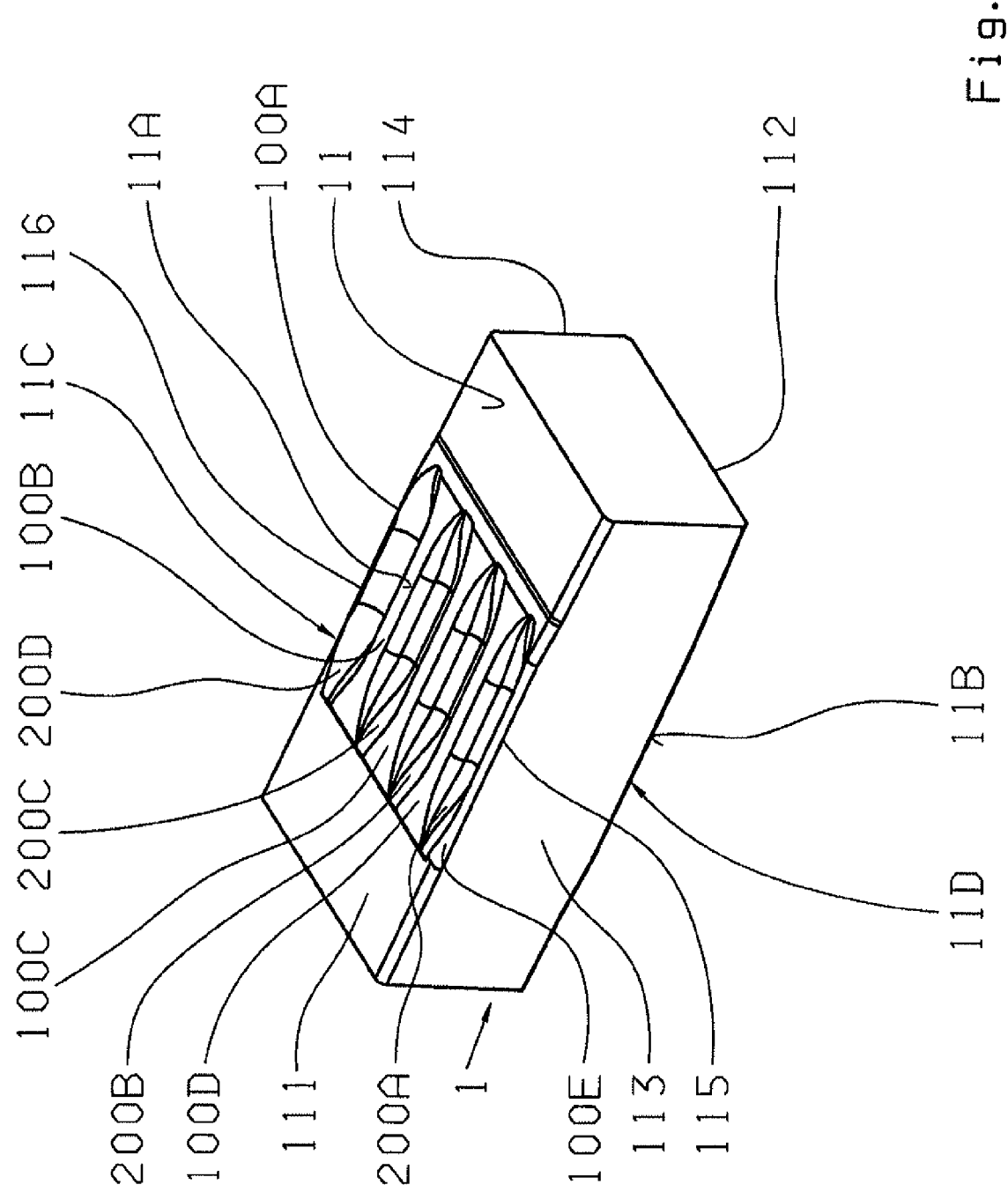

The further embodiment of the transverse leaf spring 1 represented in FIG. 18, the region of the recesses 11C and 11D of the transverse leaf spring 1, is formed with ribs 100A to 100E and grooves 200A to 200D that in the compressed state of the leaf spring 1 alternate and extend in the transverse direction of the vehicle, and that support the function of the regions 1C and 1D. The number of ribs 100A to 100E is selected depending on the width of the transverse leaf spring 1 and the depth of the grooves 200A to 200D, where the side ribs 100A and 100E can be omitted if necessary. In the region of the grooves 200A to 200D, the fiber portion of the transverse leaf spring is compressed or partially displaced onto the ribs 100A to 100E, where the transitions between the ribs 100A to 100E and the grooves 200A to 200D as well as between the remaining surface 11 of the transverse leaf spring 1, are designed optimized for stress so that only minimal stress increases are generated in the transitions. The depth of the grooves 200A to 200D varies in the transverse and longitudinal direction of the vehicle, each substantially having a maximum in the center region, and minimums at opposing edge regions in the transverse vehicle direction.

Figure 19:
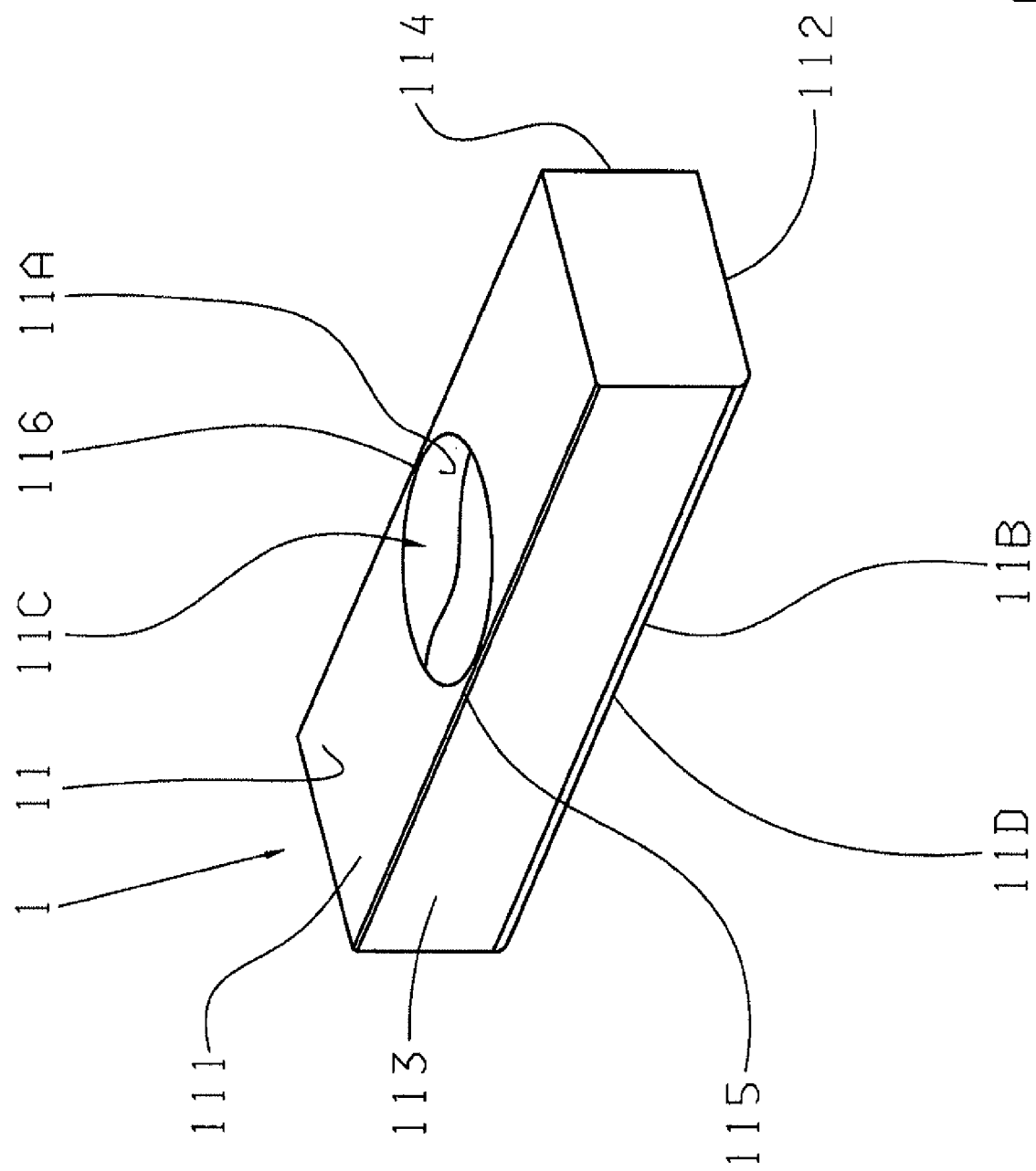

The embodiment of the transverse leaf spring 1 represented in FIG. 19 is formed with recesses 11C and 11D each of which comprises a rotated cosine contour, and is stamped into the surface 11 of the transverse leaf spring 1. In the assembled state of the transverse leaf spring 1, the recesses 11C and 11D, in a manner similar to the example embodiment described above, are each bounded in the longitudinal direction x of the vehicle by edge regions 115 and 116 of the top side 111 and the bottom side 112 formed between the top side 111 and the bottom side 112 and a lateral surfaces 113, 114 of the transverse leaf spring 1, and the thickness of the transverse leaf spring 1 in the regions thereof preferably corresponds substantially to the thickness outside of the recesses 11C and 11D.

Depending on the present application case, other suitable rotationally symmetric shapes can be provided for the shape of the recesses of the transverse leaf spring, such as a truncated cone, a hemisphere or the like, each having rounded transitions to the remaining surface 11 of the transverse leaf spring 1.

Figure 20:
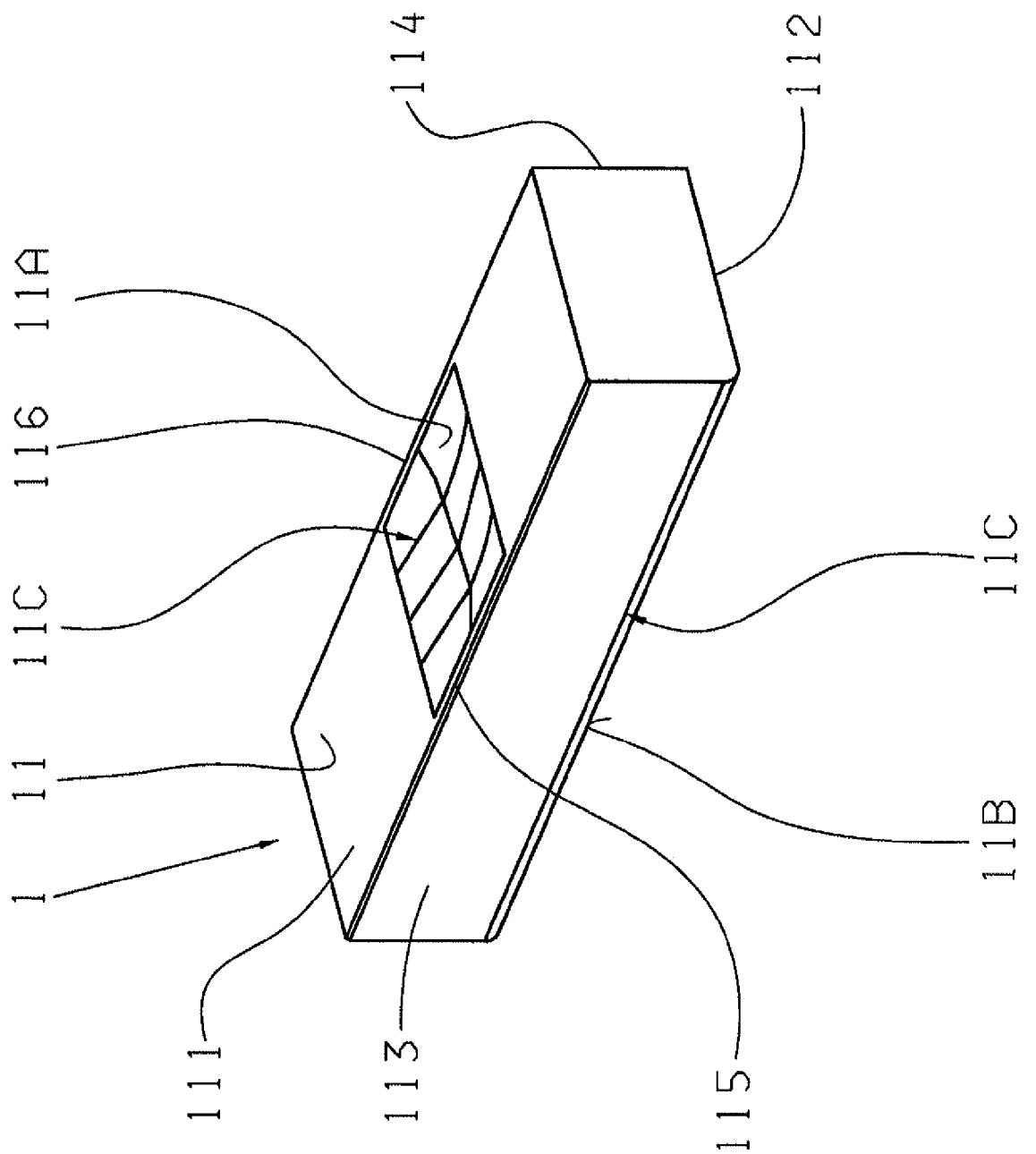

In the example embodiment of the transverse leaf spring 1 according to FIG. 20, the recesses 11C and 11D of the transverse leaf spring 1 are stamped into the transverse leaf spring with a rounded rectangular shape having a cushion-like shape. The contour can be produced by two perpendicularly overlapping cosine contours, which guarantees a minimal stress increase in the region between the bearing location of the bearing mechanism 4 of the transverse leaf spring 1 and the remaining surface 11 of the transverse leaf spring 1. Principally, the possibility exists to design the transverse leaf spring also in the region of the recesses 11C and 11D with the same width as in the remaining progression of the transverse leaf spring 1, whereby an increased portion of fibers is present in the cross section of the transverse leaf spring in the region of the recesses 11C and 11D. In the assembled state of the transverse leaf spring 1, the recesses 11C and 11D are each bounded, in the longitudinal direction of the vehicle x, by edge regions 115 and 116 of the top side 111 and the bottom side 112, formed between a top side 111 and a bottom side 112 and lateral surfaces 113, 114 of the transverse leaf spring 1, where in the region of the edge regions the thickness of the transverse leaf spring 1 preferably corresponds substantially to the thickness outside of the recesses 11C and 11D.

Figure 21:
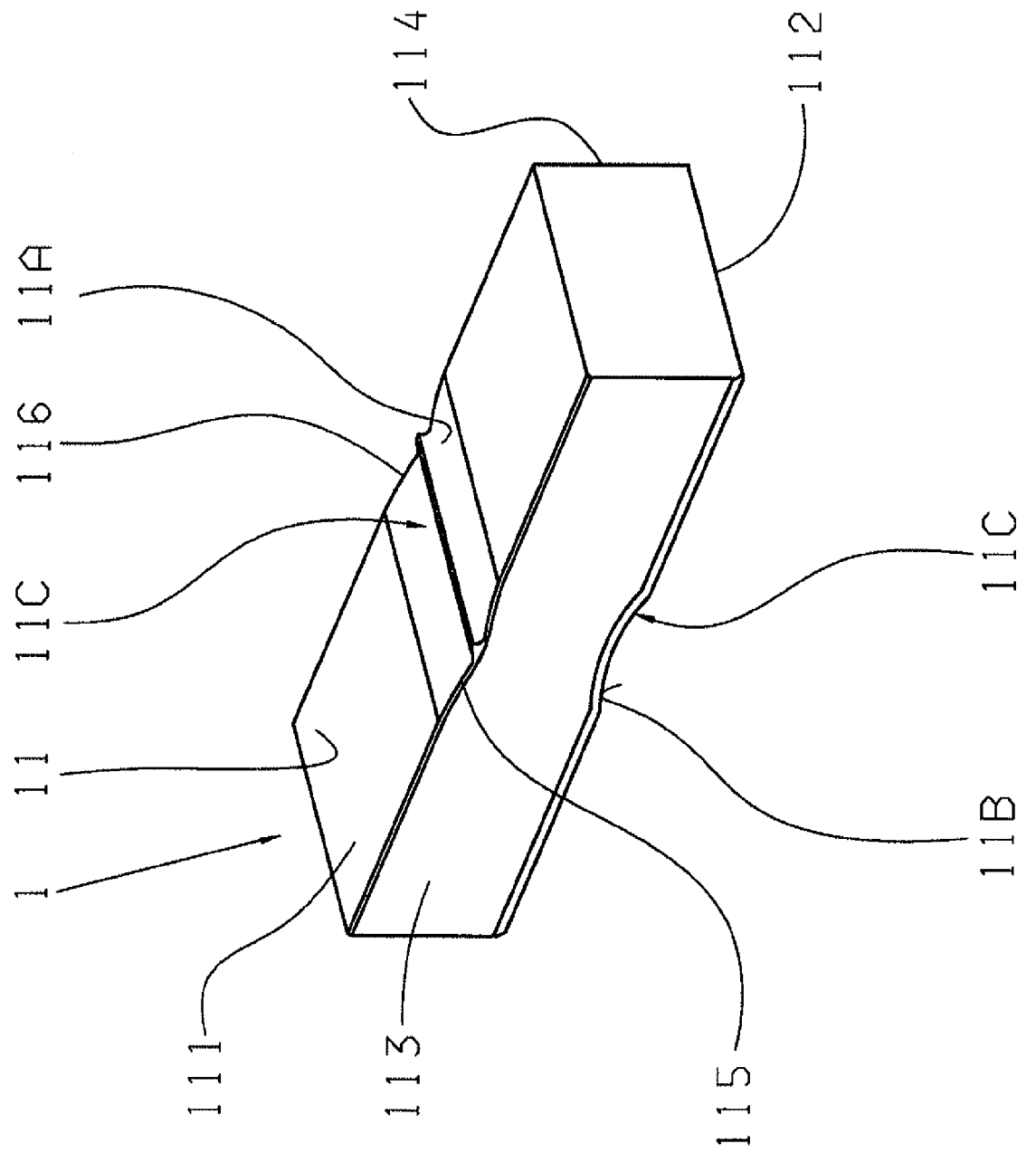

The embodiment of the transverse leaf spring 1 represented in FIG. 21, in the region of the recesses 11C and 11D, comprises a region 1C or 1D each extending over the entire width of the transverse leaf spring 1, where during production the transverse leaf spring 1 is strongly compressed in the vertical direction of the vehicle, or z-direction. This in turn leads to an increased portion of fiber in the contact region of the bearing mechanism 4. The main function of the regions 1C and 1D is centering the bearing mechanism 4 on the transverse leaf spring 1 in the longitudinal direction. If the regions 1C and 1D are designed, starting from a center region of the transverse leaf spring 1, increasing slightly in the direction toward the outsides of the transverse leaf spring 1 in the longitudinal direction of the vehicle, then it is also possible to center the bearing mechanism 4 on the transverse leaf spring 1 in the transverse direction.

Figure 22:
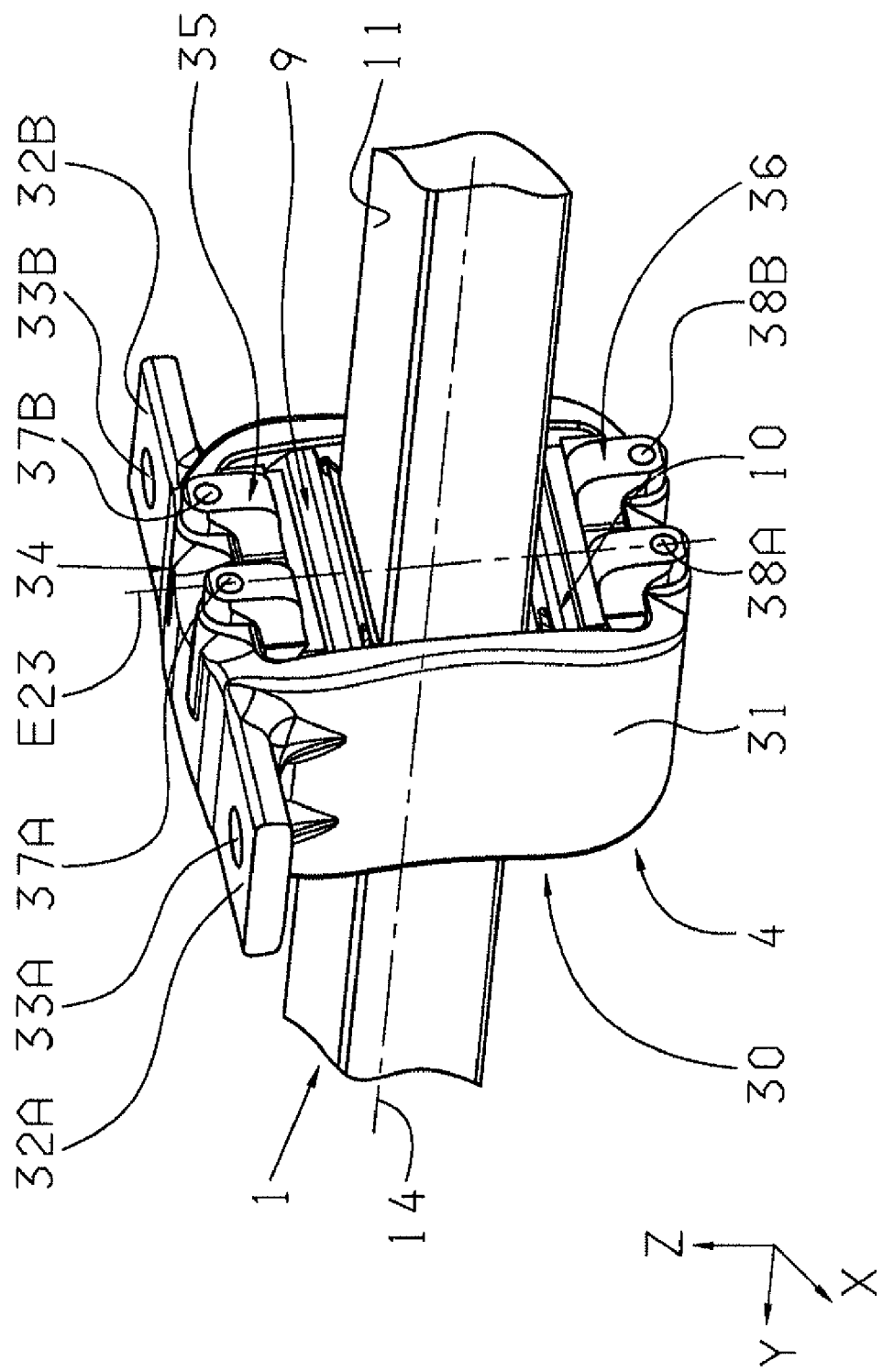
FIG. 22 a three-dimensional partial representation of the transverse leaf spring with a further embodiment of the bearing mechanism according to the invention, which is disposed in a center region of the transverse leaf spring.

FIG. 22 shows a three-dimensional partial representation of the transverse leaf spring 1 with a further example embodiment of the bearing mechanism 4 of which in FIG. 3 a longitudinal sectional view is shown along a sectional plane E23 represented graphically in FIG. 22 only by a dash dotted line. The sectional plane E23 extends in a vertical direction z of the vehicle and in the transverse direction y of the vehicle, and it corresponds to a so-called yz-sectional plane.

The bearing mechanism 4 comprises an outer bearing shell device 30 having a one-piece bearing ring element 31 that is formed as a closed metal part. With this, strong forces and torques can be transferred between the transverse leaf spring 1 and the vehicle chassis or an auxiliary frame, while simultaneously having a small construction space requirement. The bearing ring element 31 can be bolted together via two connecting devices 32A, 32B, in this case formed as connecting flanges and disposed with respect to the vertical axis z of the vehicle at the top of the bearing ring element 31, on the side of the vehicle chassis in the region of bolts 33A, 33B, and can be securely connected to the vehicle chassis or to an auxiliary frame coupled thereto. However, alternatively, it is possible to secure the bearing mechanism 4 on the vehicle chassis-side via another suitable fastening measures.

The bearing ring element is formed having a centering region 34 between the connecting flanges 32A, 32B that in the assembled state of the bearing mechanism 4 interacts with a vehicle chassis-side centering region and aligns the bearing mechanism 4 with respect to the vehicle chassis in the longitudinal direction x and transverse direction y of the vehicle. The centering region 34 is present as an elevation formed at the outside of the bearing ring element 31, proceeding in the transverse direction of the vehicle and formed having a rounded contour, and protruding in the vertical direction z of the vehicle, that engages in a corresponding recess in the vehicle chassis.

The transverse leaf spring 1 is completely encompassed by the bearing ring element 31, where insertion devices 9, 10 and an upper wedge-like tensioning element 35 and a lower tensioning element 36 are each disposed between a top of the transverse leaf spring 1 positioned in reference to the vertical direction z of the vehicle, and the bottom of the transverse leaf spring 1. The tensioning elements 35 and 36 are each slid in between the bearing ring element 31 and the insertion devices 9 or 10, in order to provide vertical pretensioning of the insertion devices 9 and 10 disposed between the bearing ring element 31 and the transverse leaf spring 1, and depending on the respective application case can be produced from metal, fiber composite and or purely composite material.

The upper tensioning element 35 is bolted in the region of bore holes 37A, 37B to the bearing ring element 31, whereas the lower tensioning element 36 is bolted in the region of bore holes 38A, 38B to the bearing ring element 31. Alternatively, however, there is the possibility to connect the tensioning elements 35, 36 each via only one bolt to the bearing ring element 31 or to provide another suitable type of connection.

The tensioning force generated by the tensioning elements 35 and 36 depending on the insertion path of the tensioning elements 35 and 36 into the bearing ring element 31, is supported in the region of the shoulder 40 of the bearing ring element 31.

In the present example embodiment, the tensioning elements 35 and 36 are each formed as separate components. In further advantageous embodiments it is possible to connect the tensioning elements to thin webs laterally encompassing the transverse leaf spring 1 to simplify an assembly, whereby the tensioning elements are formed as a hollow ring bodies that can be simply slid on or assembled on the transverse leaf spring. The tensioning elements are then formed elastically deformable in the region of the webs, in order to compensate expansions and compressions in the region of the webs created due to component tolerances and the like when the bearing pretensioning force is applied.

The insertion devices 9 and 10 here comprise two layer elements 9A, 9B or 10A 10B, and each has additionally an insertion part 9D or 10D formed substantially semi-cylindrically. The layer elements 9A and 10A of the insertion devices 9 and 10 are produced from a resilient material, which is applied during a vulcanization onto the metal layer elements 9B, or 10B and onto the insertion parts 9D and 10D that are presently similarly produced from metal, or which encompasses each of the layer elements 9B or 10B, as well as the insertion parts 9D or 10D at least in sections.

The insertion parts 9D and 10D can also be produced from plastic, fiber composite materials, natural materials, such as wood, stone and the like, as well as from different metal materials.

The layer elements 9B or 10B and the insertion parts 9D or 10D are each designed with greater stiffness than the layer elements 9A or 10A. Due to the stiffer embodiment of the insertion parts 9D and 10D, the service life of the bearing mechanism 4 is increased, and the bearing stiffness of the bearing mechanism 4 in the longitudinal direction x, transverse direction y and vertical direction z of the vehicle can be created higher than for bearing mechanisms without insertion parts.

However, alternatively to the described example embodiment it is also possible to design the insertion devices 9 and 10 without the bearing elements 9B and 10B designed with greater stiffness.

If the insertion parts 9D or 10D are formed with a resilient protective coating in the contact surfaces facing the transverse leaf spring 1, then a surface 11 of the transverse leaf spring 1 is sufficiently protected against damage in particular during oscillating loads, which can negatively impact the service life of the transverse the leaf spring to an undesired extent.

In addition, the protective coating can prevent fine dirt particles from penetrating between the insertion parts 9D and 10D and the transverse leaf spring 1. Furthermore, due to a protective coating preferably implemented as a vulcanization coating of the insertion parts 9D and 10D, manufacturing tolerances in the region of the form-locking between the bearing mechanism 4 and the transverse leaf spring 1 can be compensated, and a coefficient of friction between the insertion parts 9D and 10D and the transverse leaf spring 1 can be increased by suitable material selection and corresponding surface characteristics of the protective coating.

Depending on the present application case, so-called thrust plates can be inserted in the layer elements 9A and 10A in order to be able to adjust the rotation stiffness about the bearing axis, which corresponds to the vehicle longitudinal axis x, in a suitable ratio to the vertical stiffness. Due to the additional thrust plate a relatively low torsional stiffnesses can be adjusted even at high vertical stiffness.

The insertion devices 9 and 10 are formed in the contact surfaces 9E and 10E that are facing the support surfaces 11A and 11B of the transverse leaf spring 1, with each having at least one receiving device 9F or 10F, into which in the assembled state of the insertion devices 9 and 10 a region 1C or 1D of the transverse leaf spring 1 engages in a form-locking manner. Additionally, in the vertical direction z of the vehicle, the transverse leaf spring 1 in the region of the support surfaces 11A and 11B, comprise recesses 11C, 11D each for the insertion devices 9 or 10, and into which the insertion devices 9 and 10 engage in a form-locking manner via a correspondingly shaped insertion parts 9D and 10D, so that during operation of a vehicle relative movement of the transverse leaf spring 1 in the transverse direction of the vehicle y with respect to the vehicle chassis is avoided in a constructively simple manner and via an additional form-locking between the transverse leaf spring 1 and the bearing mechanism 4, in addition due to the force locking connection to the bearing mechanism 4.

The recesses 11O and 11D, or the contours of the recesses 11C and 11D, are formed such that during operation stress is distributed as a uniformly as possible in a contact region of the bearing mechanism 4 at transverse leaf spring 1 which favorably influences the service life of the transverse leaf spring 1. The contour of the recesses 11C and 11D each substantially correspond to a special cosinusoidal indentation in the y-direction, thereby attaining a stress distribution that is as uniform as possible in the bearing region of the transverse leaf spring 1.

The transverse leaf spring 1, in the region of the surface 11 thereof, is implemented at least in the contact region to the bearing mechanisms 4 and 5 having a special surface coating or surface treatment, in order to increase the hardness of the surface 11 of the transverse leaf spring 1 with respect to the remaining surface 11, and to provide a larger coefficient of friction compared to the untreated state for increasing the connection forces in the region of the form-locking between the transverse leaf spring 1 and the bearing mechanism 4 and 5. Additionally it is possible to use a special surface coating or surface treatment of the surface 11 of the transverse leaf spring 1 in order to facilitate or simplify the manufacturing process for producing the regions 1C and 1D of the transverse leaf spring 1, for instance the process of demolding the transverse leaf spring 1 from the tool.

For example, an adhesive layer, a varnish layer, a plastic material and a plastic layer implemented with nanoparticles, are conceivable as a surface coating. During a surface treatment, the surface 11 of the transverse leaf spring 1 is pretreated with a fluid increasing the adhesion property of the surface for example, and then particles increasing the hardness or the coefficient of friction are applied onto the surface of the transverse leaf spring in the cited region, for example by vapor deposition.

In the assembled state of the bearing mechanism 4 and 5, the center of rotation of the two insertion devices 9 and 10 lies substantially on the neutral fiber 14 of the transverse leaf spring 1, whereby deformations in the region of the insertion devices 9 and 10 are advantageously of substantially uniform extent. The recesses 11C and 11D of the transverse leaf spring 1, which are preferably cosinusoidal the transverse direction of the vehicle, provide a form-locking connection of the bearing mechanism 4 to the transverse leaf spring 1, where the cosinusoidal form, or the cosinusoidal transition between the surface 11 of the transverse leaf spring 1 outside of the recesses 11C and 11D and the support surfaces 11A and 11B in the region of the recesses 11C and 11D guarantees a transition that is as smooth as possible in the progression of the individual fibers of the transverse leaf spring 1 produced from composite material. The smooth transition in the progression of fibers of the transverse leaf spring 1 prevents adverse influence to the service life of the transverse leaf spring 1 in a simple manner.

FIG. 24 to FIG. 32*b* show further advantageous example embodiments of the bearing mechanism 4 according to the invention, which mainly differ only in partial regions from the example embodiment of the bearing mechanism 4 shown in FIG. 22 and FIG. 23, which is why in the following description for FIG. 24 to FIG. 32*b* only the differences are described, and for the remaining function for the following example embodiments of the bearing mechanism 4 reference is made to the description for FIG. 22 and FIG. 23. The tensioning elements of the following example embodiments of the bearing mechanism 4 can be formed as described above as one-piece or multi-piece, depending on the present application case.

Figure 24:
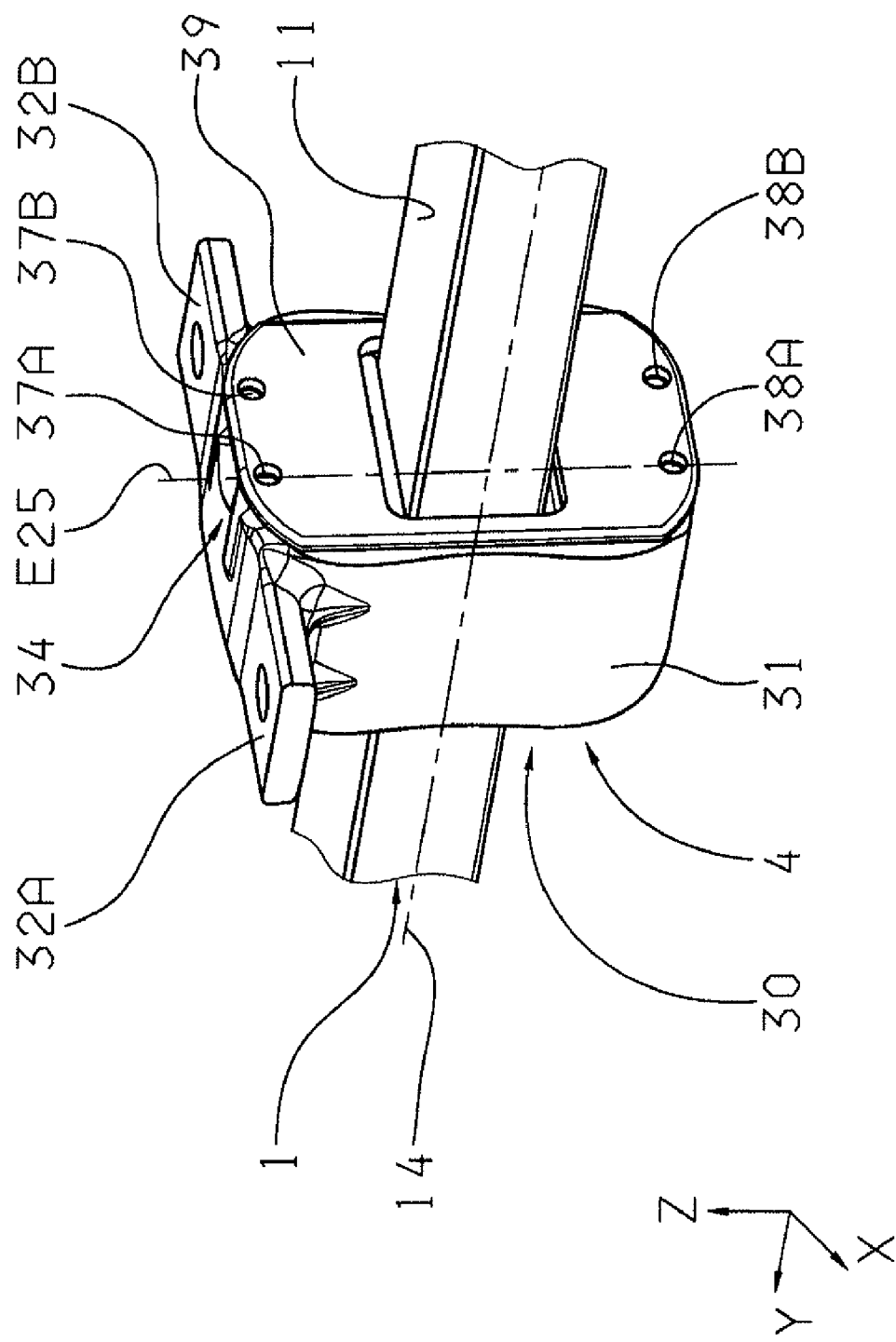
FIG. 24 a representation according to FIG. 22 of a further embodiment of the bearing mechanism according to the invention.

In the example embodiment shown in FIG. 24, the pretensioning force required for representing a desired bearing function of the bearing mechanism 4 is made available via the tensioning elements 35A, 35B and 36A, 36B, formed as a hollow cylinder and in segments, where the pretensioning force of the bearing mechanism 4 is created via a plate 39 that can be securely connected to the bearing ring element 31 preferably via a bolted connection.

In the assembled state of the cover plate 39, tensioning elements 35B and 36B are increasingly slid in between the bearing ring element 31 and the insertion devices 9 and 10. The pretensioning force generated by the tensioning elements 35B and 36B is introduced into the tensioning elements 35A, 36A via the insertion devices 9 and 10, and supported in the region of the shoulder 40 and the transverse leaf spring 1.

As an alternative to the described bolted connection, depending on each application case, the cover plate 39 can also be connected to the bearing ring element to the desired extent via another suitable type of connection, for instance rivets, flanging or the like.

Figure 23:
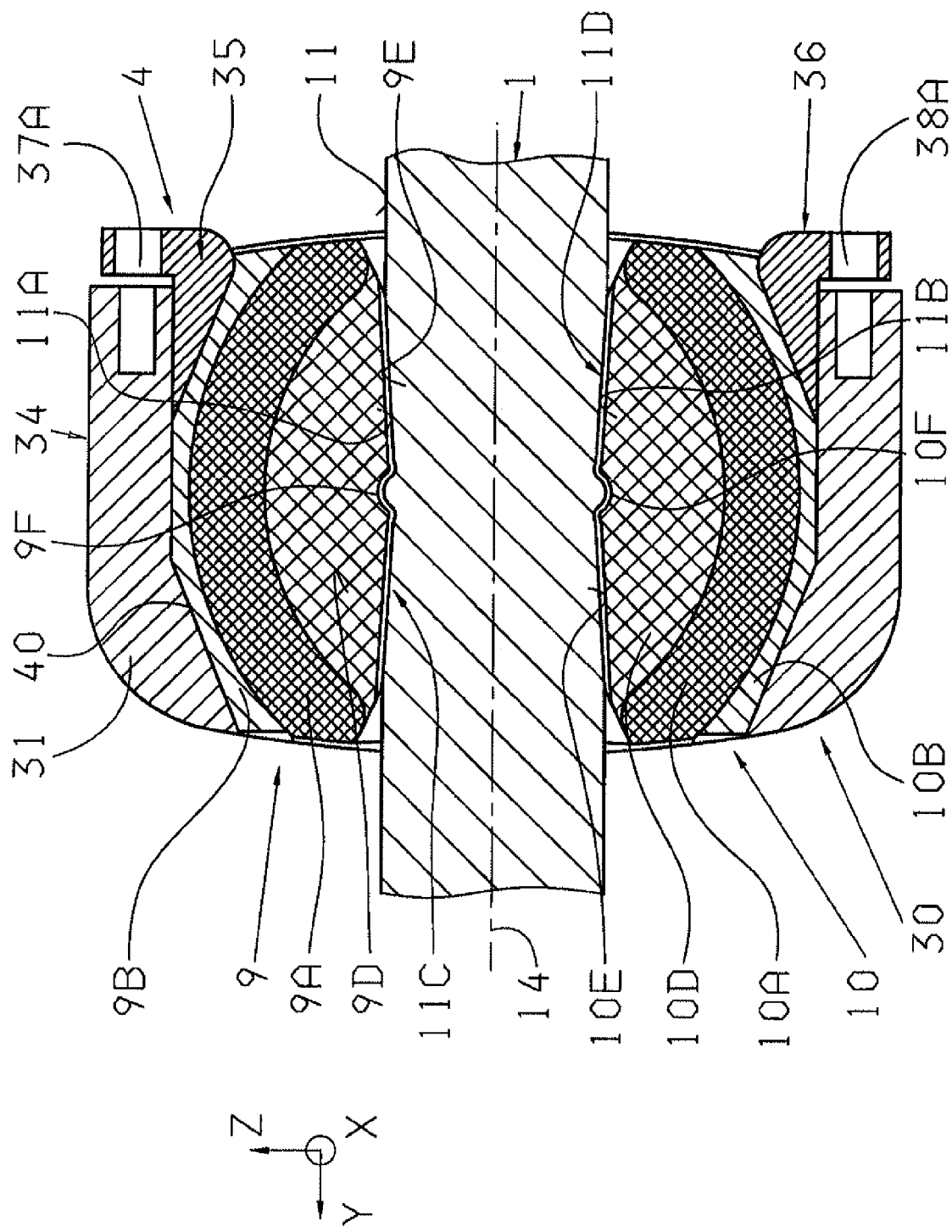
FIG. 23 the bearing mechanism according to FIG. 22 in a longitudinal section along the longitudinal sectional plane E23, shown in more detail in FIG. 22, that extends in the vertical and transverse direction of the vehicle.
Figure 25:
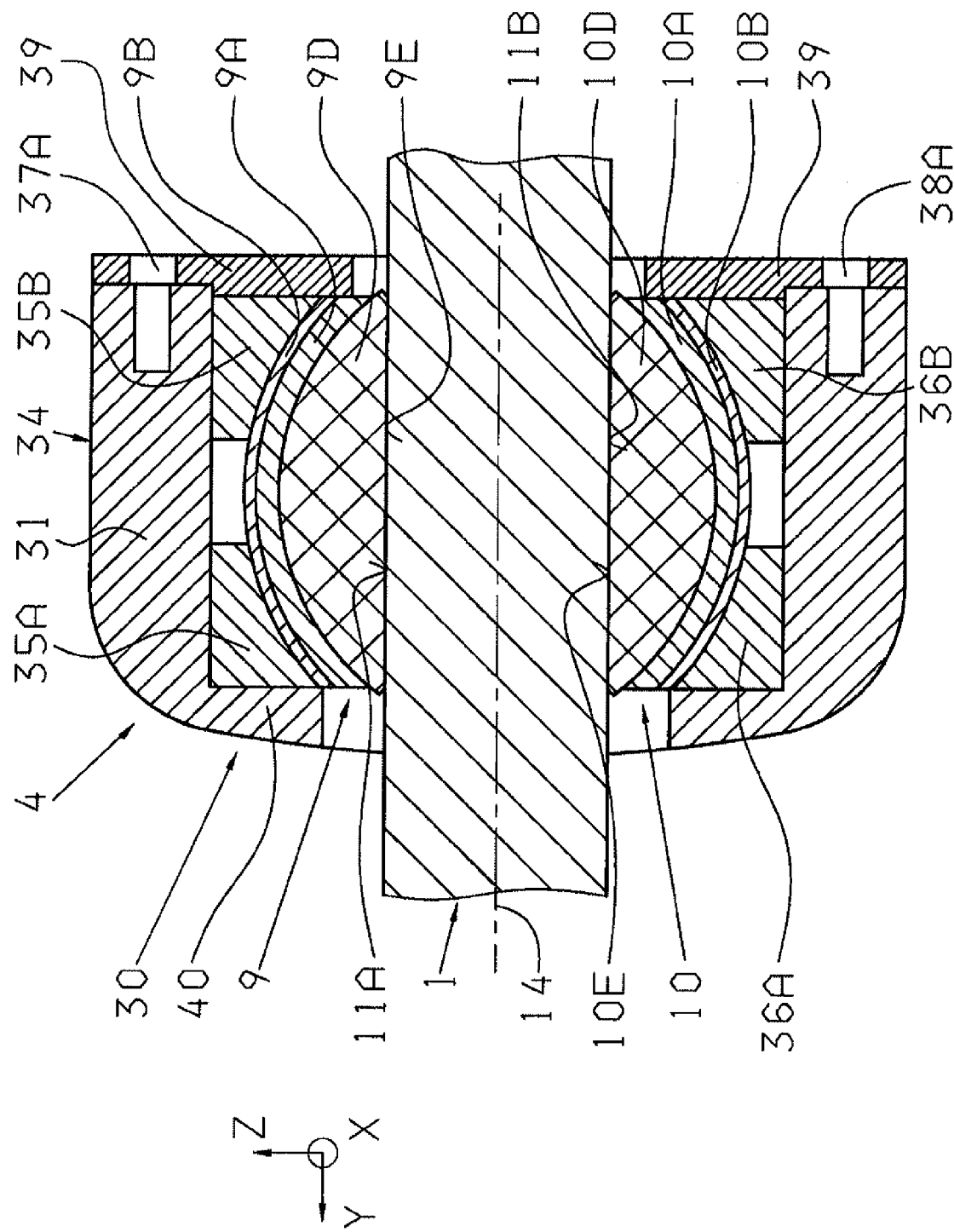
FIG. 25 a representation according to FIG. 23 of the bearing mechanism according to FIG. 24 in a longitudinal sectional view along a longitudinal sectional plane E25 shown in more detail in FIG. 24, that is oriented both in the vertical and transverse direction of the vehicle.

In the further example embodiment of the bearing mechanism 4 represented in FIG. 24 and FIG. 25, there is no additional form-locking in the region between the insertion parts 9D and 10D and the transverse leaf spring 1, as was the case with the bearing mechanism 4 according to FIG. 22 and FIG. 23. This also holds for the further example embodiments of the bearing mechanism 4 represented in FIG. 26 to FIG. 32*b*. It lies within the discretion of the person skilled in the art to form the further example embodiments of the bearing mechanism 4 depicted in the drawing also with a form-locking connection in the region between the insertion devices 9 and 10 and the transverse leaf spring 1.

Figure 26:
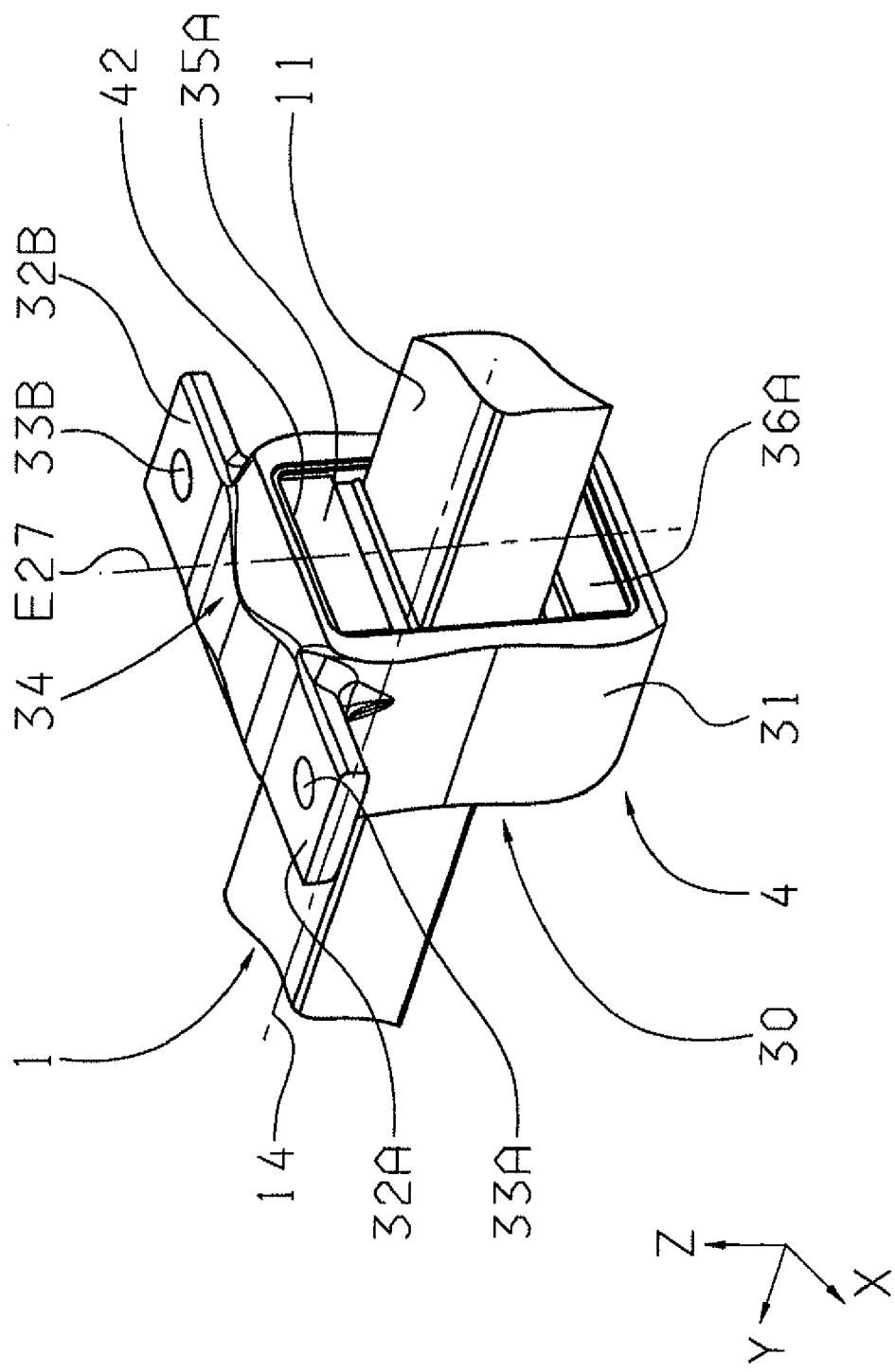
FIG. 26 a representation according to FIG. 22 of a further embodiment of the bearing mechanism according to the invention.
Figure 27:
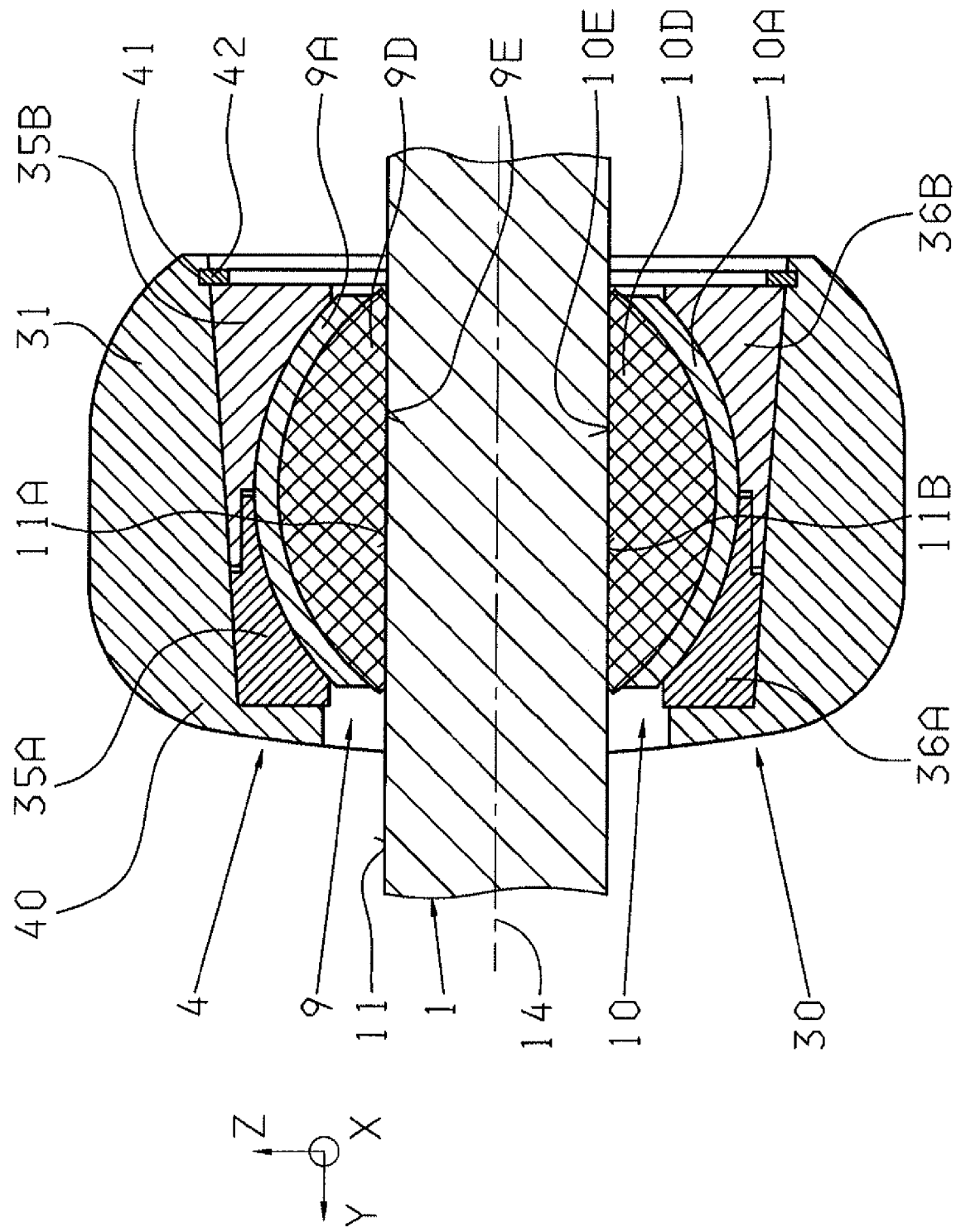
FIG. 27 a longitudinal sectional view according to FIG. 23 of the bearing mechanism according to FIG. 26, along a longitudinal sectional plane E27 shown in more detail in FIG. 26, which extends both in the vertical and transverse direction of the vehicle.

In the further example embodiment of the bearing mechanism 4 represented in FIG. 26 and FIG. 27, the tensioning elements 35A 35B, and 36A, 36B are held in the pre-tensioning position thereof applying the pretensioning force via a locking ring 42 disposed in a groove 41 of the bearing ring element 31. In contrast to the example embodiment of the bearing mechanism 4 according to FIG. 24, the tensioning elements 35A, 35B and 36A, 36B overlap in the transverse direction y of the vehicle and in the vertical direction of the vehicle, in order to guarantee a particularly good force transfer between the vehicle chassis and the transverse leaf spring 1.

Figure 28:
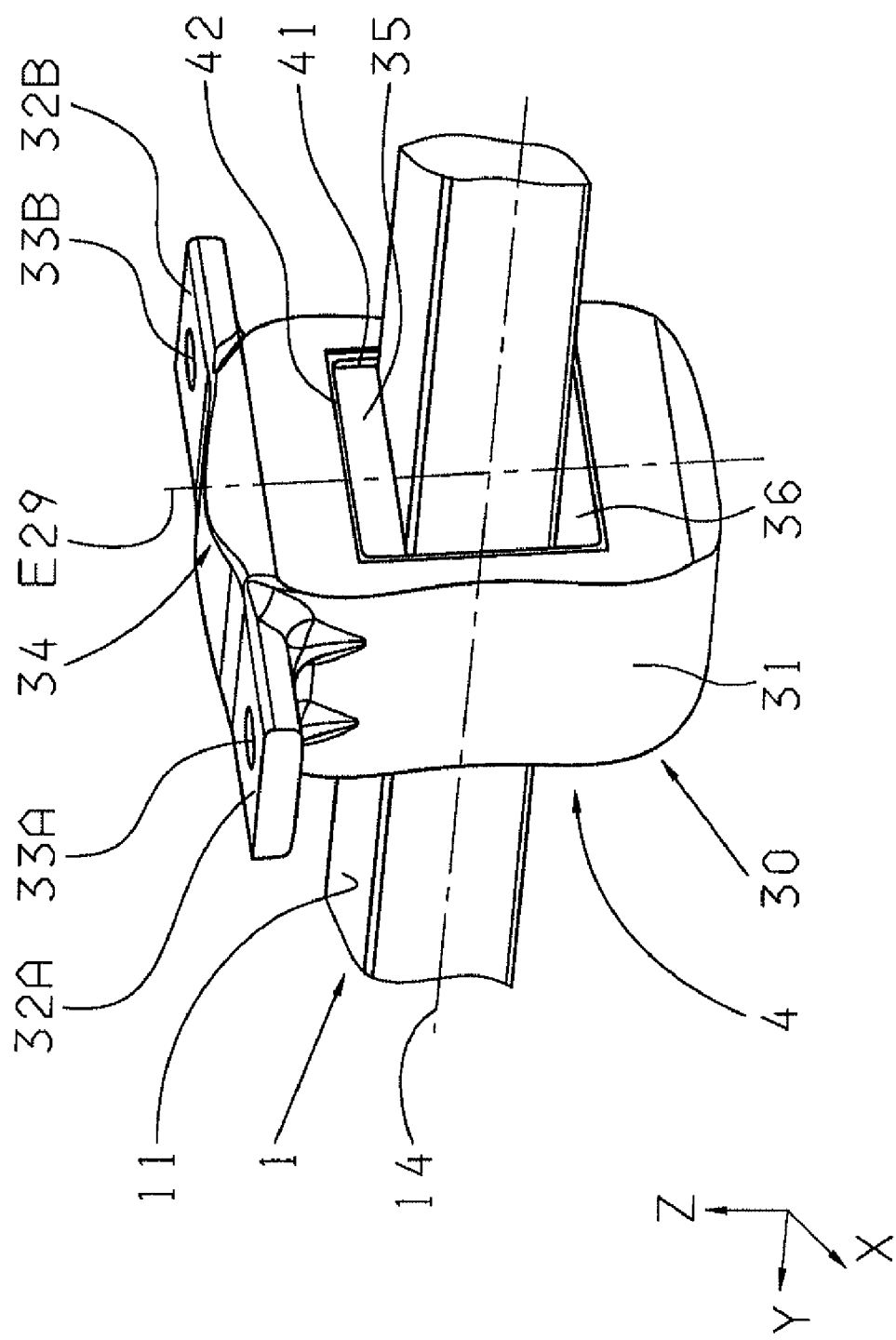
FIG. 28 a representation according to FIG. 22 of a further example embodiment of the bearing mechanism according to the invention.
Figure 29:
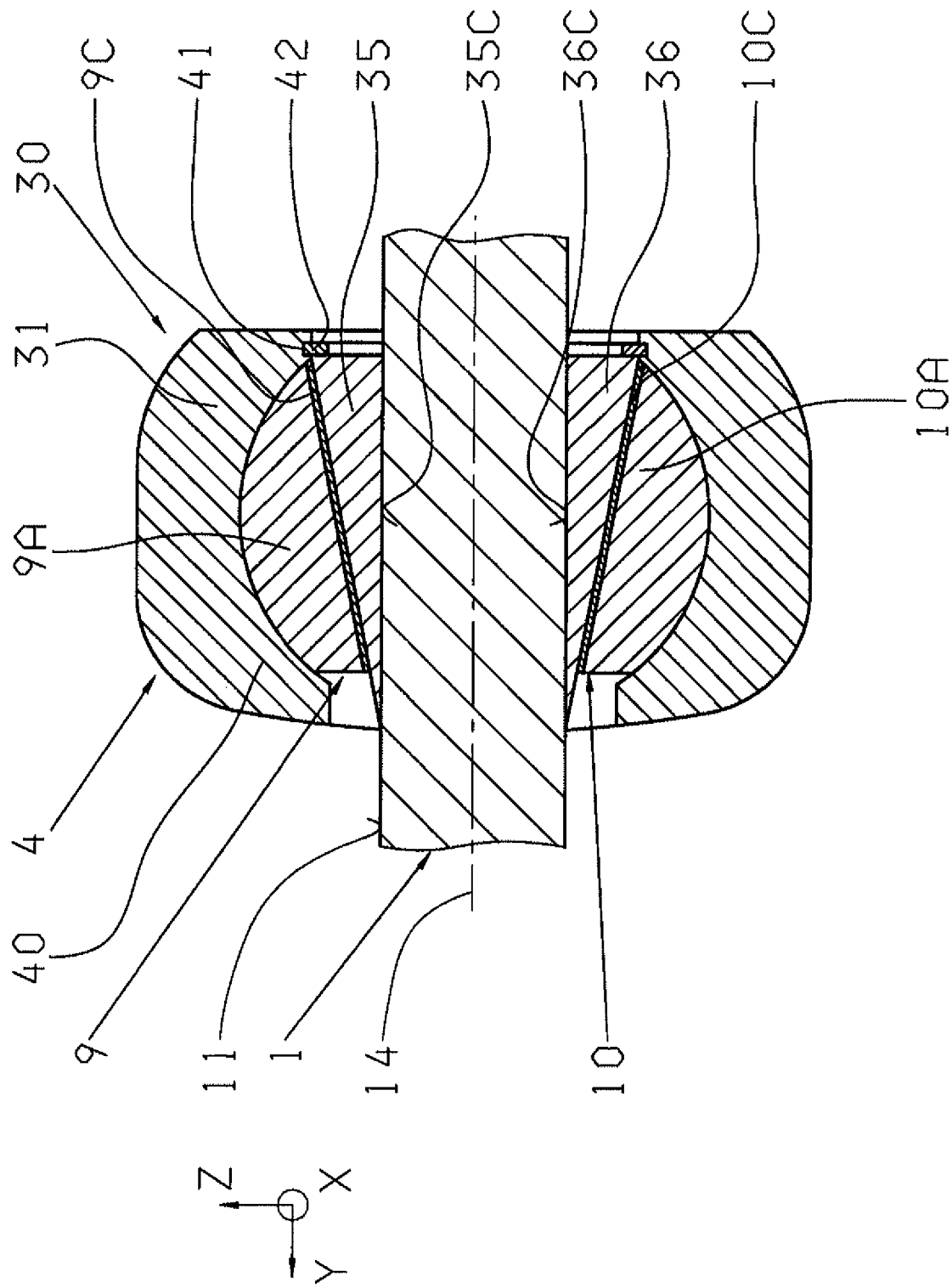
FIG. 29 a longitudinal sectional view corresponding to FIG. 23 of the bearing mechanism according to FIG. 28 along a sectional plane E29 extending in the vertical and transverse direction of the vehicle.

FIG. 28 and FIG. 29 show a further example embodiment of the bearing mechanism 4 in which the tensioning elements 35 and 36 are each positioned between further layer elements 9C and 10C and the surface 11 of the transverse leaf spring 1, which can be produced from metal, fiber composite plastic material or a purely plastic material, and are represented here as separate components, where the further layer elements 9C and 10C can also be formed as one-piece. The further layer elements 9C and 10C are formed with greater stiffness than the resilient layer elements 9A and 10A, and are disposed between the resilient layer elements 9A and 10A and the tensioning elements 35, 36. The wedge-shaped tensioning elements 35 and 36 of the bearing mechanism 4 according to FIG. 28 and FIG. 29 extend over the entire bearing width between the further layer elements 9C and 10C and the transverse leaf spring 1.

The additional layer elements 9C and 10C offer the possibility to introduce the pretensioning force from the tensioning elements 35 and 36 into the resilient layer elements 9A and 10A as uniformly as possible and in a simple manner, particularly during tipping movements of the transverse leaf spring 1 in the region of the bearing mechanism 4. Furthermore, depending on the application case, the further layer elements 9C and 10C can be connected to the layer elements 9A and 10A using vulcanization, and provide a simple manner to prevent the tensioning elements 35 and 36 from damaging the resilient layer elements 9A and 10A during the assembly of the bearing mechanism 4.

The tensioning elements 35 and 36 are held in the pretensioning position thereof via the locking ring 42. In order to avoid undesired self-actuated locking of the tensioning elements 35 and 36 after the assembly of the bearing mechanism 4, the tensioning elements are formed with a surface coating increasing the coefficient of friction in surface regions 35C, 36C assigned to the surface 11 of the transverse leaf spring 1. Alternatively, it is possible to form the surface 11 of the transverse leaf spring 1 in the contact region with the tensioning elements 35 and 36 having a coating increasing the coefficient of friction, or a specific surface profile shown for example in FIG. 32a and FIG. 32b, which prevents the loosening of the tensioning elements 35 and 36.

Figure 30:
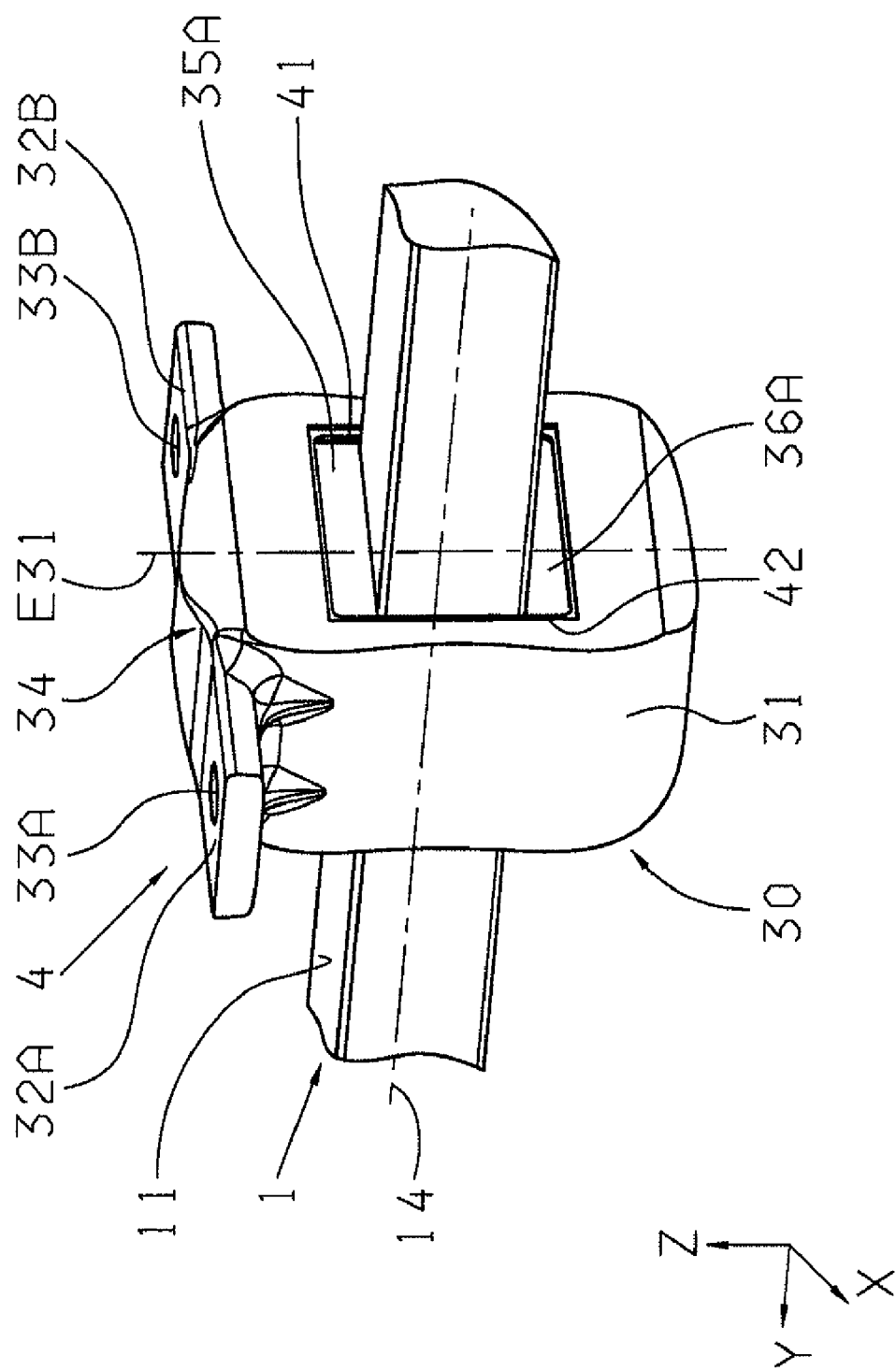
FIG. 30 a representation according to FIG. 22 of a further example embodiment of the bearing mechanism according to the invention.
Figure 31:
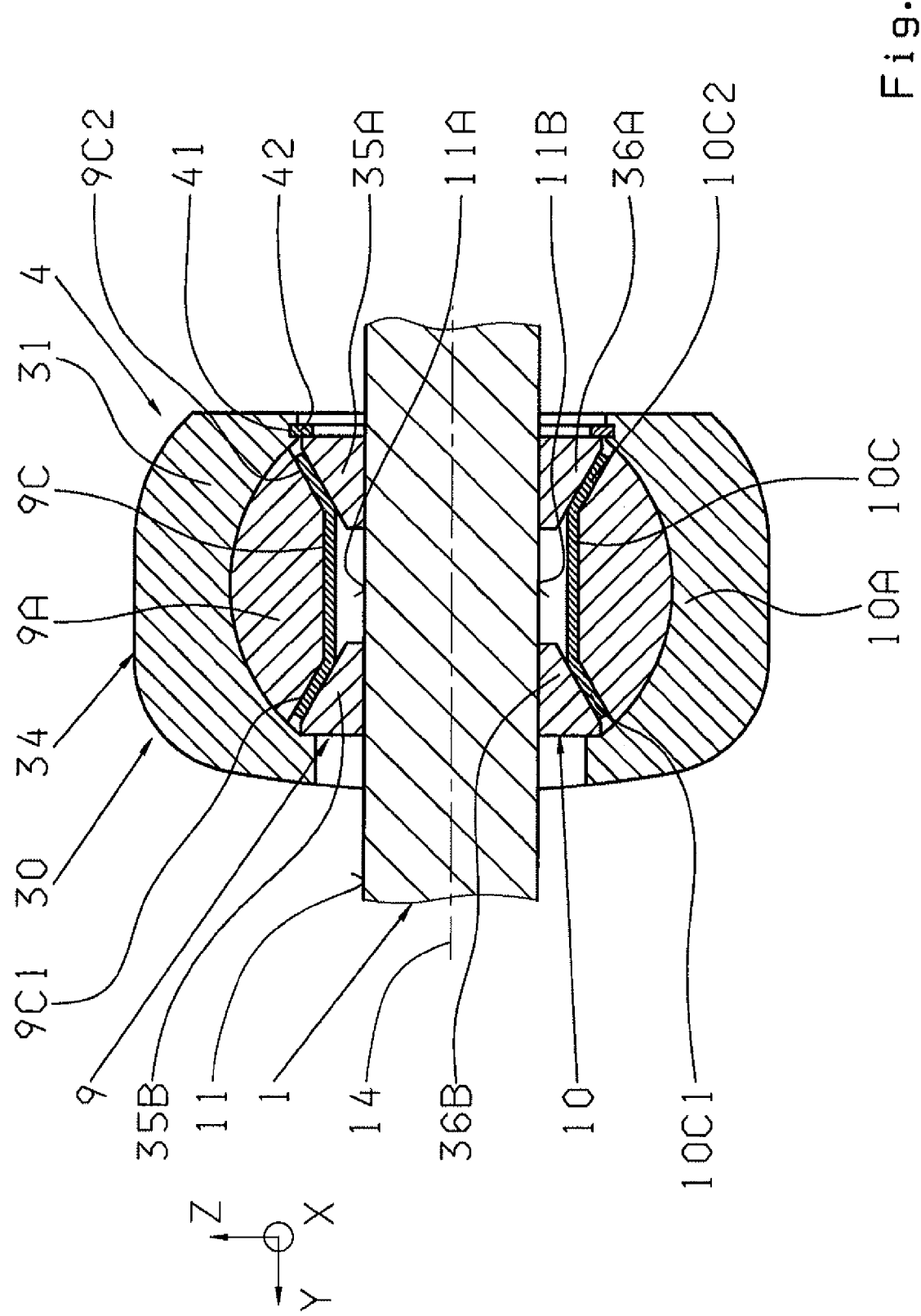
FIG. 31 representation according to FIG. 23 of the bearing mechanism according to FIG. 30 along a sectional plane E31 extending in the vertical and transverse direction of the vehicle.

A further example embodiment of the bearing mechanism 4 is shown in FIG. 30 and FIG. 31, in which the bearing mechanism 4 comprises a similar construction to the bearing mechanism 4 according to FIG. 28 and FIG. 29, however in a symmetrical design. The pretensioning force is again generated in each case via wedge-shape tensioning elements 35A, 35B and 36A, 36B, which are disposed between the surface of the transverse leaf spring 1 and the further layer elements 9C and 10C and the resilient layer elements 9A and 10A.

The further layer elements 9C and 100 are formed having substantially planar central regions and angled end regions 9C1, 9C2, 10C, 10C2, in each case adapted to the inclines of the tensioning elements 35A, 35B and 36A, 36B, where the layer elements 9A and 10A in the contact region thereof with the further layer elements 9C and 10C are each adapted to the shape of the layer elements 9C and 10C. On the sides of the layer element facing away from the transverse leaf spring 1, the resilient layer elements 9A and 10A are applied directly onto the bearing ring element 31.

Figure 32B:
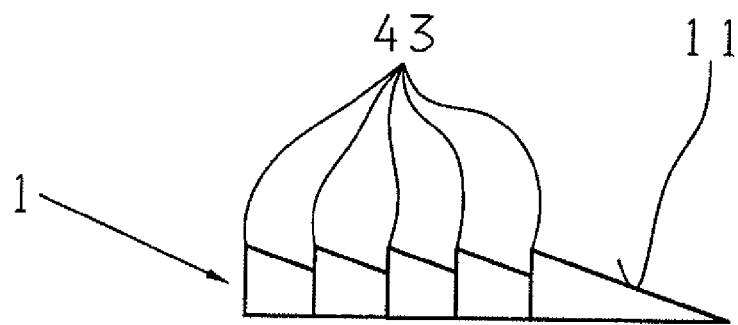
Figure 32A:
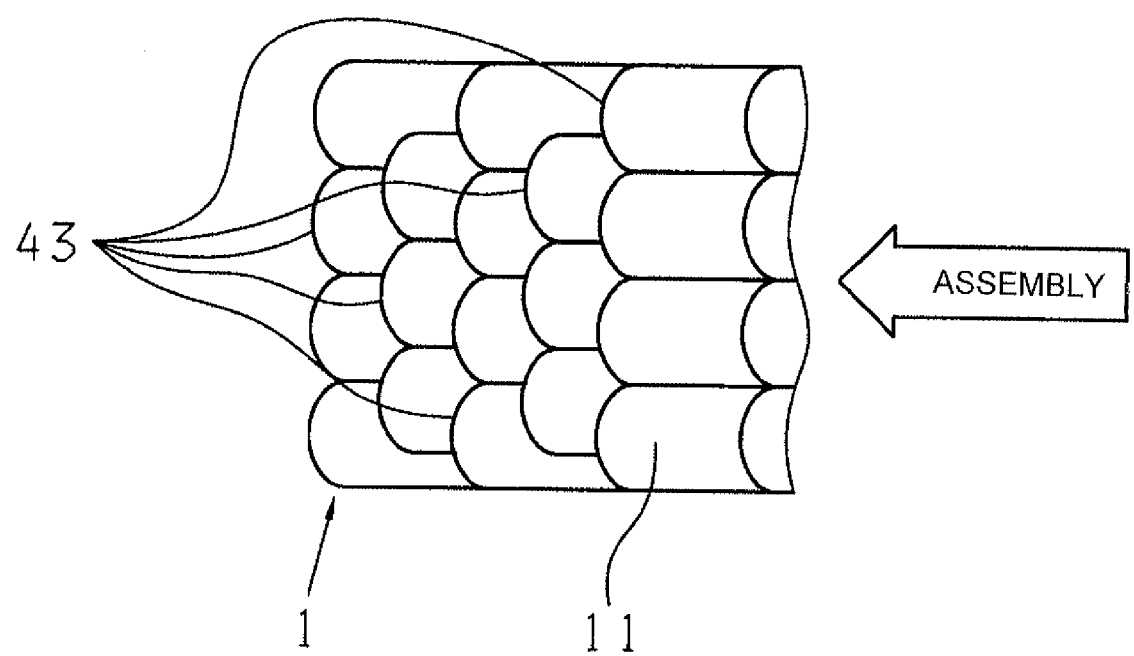
FIG. 32a an enlarged schematic partial individual view of a defined top surface region of a tensioning element of the bearing mechanism according to the invention.

FIG. 32a and FIG. 32b show a preferred embodiment of the surface 11 of the transverse leaf spring 1 according to FIG. 28 or according to FIG. 30 in the contact region of the tensioning elements 35 and 36 or 35A, 35B, and 36A, 36B, by means of which the tensioning elements are prevented in a simple manner from slipping back out of their pretensioned position after the assembly. The arrow in FIG. 32a graphically represents the assembly direction of the tensioning elements. Because the sawtooth-like fish scale profile supports guiding the tensioning element over the surface 11 of the transverse leaf spring in the assembly direction, the assembly of the bearing mechanism 4 is not made more difficult by the surface profile of the transverse leaf spring 1. After assembly, the tips 43 effectively prevent the tensioning elements from slipping backwards.

In general, the subject matter according to the invention described above, and the different embodiments of the subject matter according to the invention offer the possibility to support forces and torques applied during operation of a vehicle in the region of a transverse leaf spring without through bores in the transverse leaf spring to the desired extend in the region of the vehicle chassis. Additionally, this requirement is also guaranteed without introducing a foreign part into the transverse leaf spring. This means that forces and torques of central bearings can be transferred again onto a transverse leaf spring without negatively impacting the durability of a transverse leaf spring by holes for bolts or rivets, or other strong redirections of the fibers.

The bearing mechanisms according to the invention are formed with the respectively required high stiffness, and the surface of a transverse leaf spring is not damaged during operation by the appropriately formed bearing mechanisms. Furthermore, the smallest possible stresses during operation occur in the region of the surface of a transverse leaf spring, whereby the transverse leaf spring is not damaged by the bearing mechanism even in the case of alternating loading. Relative movements in the region between the surface of the transverse leaf spring and the bearing mechanisms or the central bearing are avoided in a constructively simple and space-saving manner. The bearing design according to the invention additionally offers in a simple manner the possibility that the torsion axis lies parallel to a xy-plane, and in the longitudinal direction, or x-direction, of the vehicle intersects with the neutral fiber of the transverse leaf spring. An exact positioning of the bearing mechanism on the transverse leaf spring is likewise guaranteed both in the x- and y-direction, whereby a transverse leaf spring can operate with high precision.

If needed, the bearing mechanism according to the invention makes it possible to fasten the bearing leaf spring directly to the vehicle chassis or to the auxiliary frame, without insulation of an auxiliary frame with respect to the vehicle chassis.

The bearing mechanism according to the invention can, without costly constructive measures, also be integrated into different wheel suspension configurations, which are formed having a transverse leaf spring and similar fiber composite components.

The upper and lower halves of the bearing mechanism 4 with respect to the vertical axis z of the vehicle can, depending on the respectively present application, be formed both symmetrically as well as with small asymmetries, where bearing asymmetries of the bearing mechanism 4 can be utilized in a targeted manner for adjusting the bearing stiffness in the different directions.

REFERENCE CHARACTERS

1 transverse leaf spring
1A, 1B end region
1C, 1D region
1C1 to C4 nose
2, 3 outer bearing
4, 5 bearing mechanism
6 outer bearing shell
6A projection
7 outer bearing shell
7A projection
8 bolt device
8A to 8D bolt element
9 insertion device
9A layer element
9A1, 9A2 bulge-like end region
9A3, 9A4 cavity
9B layer element
9B1, 9B2 end region
9C layer element
9C1, 9C2 end region
9D insertion part
9D1 recess
9E contact surface
9F receiving device
10 insertion device
10A layer element
10A1, 10A2 bulge-like end region
10A3, 10A4 cavity
10B layer element
10B1, 10B2 end region
10C layer element
10C1, 10C2 end region
10D insertion part
10D1 recess
10E contact region
10F receiving device
11 surface of the transverse leaf spring
11A, 11B support surface
11C, 11D recess of the transverse leaf spring
12 contact surface of the bearing shell
13 web
14 neutral fiber
16, 17 elevation 18, 19 stop region
18A to 19B stop
20, 21 bore hole
30 outer bearing shell device
31 bearing ring element
32A, 32B connecting flange
33A, 33B bore hole
34 centering region
35 upper tensioning element
35A, 35B tensioning element
36 lower tensioning element
36A, 36B tensioning element
37A, 37B bore hole
38A, 38B bore hole
39 plate
40 shoulder
41 groove
42 locking ring
43 tips
100A to 100E rib
111 top side of the transverse leaf spring
112 bottom side of the transverse leaf spring
113, 114 lateral surface of the transverse leaf spring
115, 116 edge region of the transverse leaf spring
200A to 200D groove
E3 to E31 sectional plane
TE1, TE2 separation plane
x longitudinal direction of the vehicle
y transverse direction of the vehicle
z vertical direction of vehicle

The invention claimed is:

1. A bearing mechanism (4) of a transverse leaf spring (1) for mounting in a region of a vehicle axle of a vehicle, the bearing mechanism (4) comprising:
an outer bearing shell device (30);
insertion devices (9, 10) with at least some regions thereof being encompassed by the outer bearing shell device (30) and each of the insertion devices (9, 10) comprising at least two layer elements (9A, 9B, 9C, 10A, 10B, 10C) with different stiffnesses;
the insertion devices (9, 10), in an assembled state, each being disposed between the outer bearing shell device (30) and the transverse leaf spring (1);
a recess (11C, 11D), for each of the insertion devices (9, 10), being formed in a region of a support surface (11A, 11B) of the transverse leaf spring (1) and at least sections of the insertion devices (9, 10) engage therein in a form-locking manner, and the recesses (11C, 11D) being provided on a top side (111) and a bottom side (112) of the transverse leaf spring (1) with respect to a vertical axis (z) of the vehicle,
in an assembled state of the transverse leaf spring (1), the recesses (11C, 11D) of the transverse leaf spring (1) each being delimited, in a longitudinal direction (x) of the vehicle, by edge regions (115, 116) of the top side (111) and the bottom side (112) formed between the top side (111) and the bottom side (112) and the lateral surfaces (113, 114), and the recesses (11C, 11D) have a shallower depth in the edge regions (115, 116) than in regions between the edge regions.

2. The bearing mechanism according to claim 1, wherein the insertion devices (9, 10) are each formed with contact surfaces (9E, 10E) which face the support surfaces (11A, 11B) of the transverse leaf spring (1), and have at least one receiving device (9F, 10F) into which, in the assembled state of the insertion devices (9, 10), a region (1C, 1D) of the transverse leaf spring (1) engages.

3. The bearing mechanism according to claim 2, wherein the regions of the transverse leaf spring (1), which engage with the insertion devices (9, 10), are provided in a region of the recesses (11C, 11D) of the transverse leaf spring (1).

4. The bearing mechanism according to claim 1, wherein the transverse leaf spring (1) has convex elevations (16, 17), as contact surfaces (11C, 11D) for the insertion devices (9, 10), which are disposed on the top side and the bottom side with respect to the vertical axis (z) of the vehicle.

5. The bearing mechanism according to claim 1, wherein an at least nearly semi-cylindrically insertion part (9D, 10D) is disposed between the layer elements (9A to 9C and 10A to 10C) and the transverse leaf spring, and the insertion parts are formed with greater stiffness than the layer elements (9A, 10A) formed with lower stiffness.

6. The bearing mechanism according to claim 5, wherein, in the assembled state, at least in contact regions (9E, 9F) of the insertion parts (9D, 10D), facing the transverse leaf spring (1), each have a resilient protective coating.

7. The bearing mechanism according to claim 5, wherein at least the layer elements (9A, 10A), formed with lower stiffness, comprise recesses (9A3, 9A4, 10A3, 10A4).

8. The bearing mechanism according to claim 5, wherein at least sections of the end regions (9B1, 9B2, 9C1, 9C2 and 10B1, 10B2, 10C1, 10C2) of the layer elements (9B, 9C and 10B, 10C), formed with greater stiffness, have a resilient protective coating.

9. The bearing mechanism according to claim 5, wherein the layer elements (9A to 10A), formed with the lower stiffness, encompass the outer bearing shell device (30) with bulge-like end regions (9A1, 9A2, 10A1, 10A2) and, in the assembled state, point in the transverse direction of the vehicle, and the outer bearing shell device (30) engages with the bulge-like end regions (9A1, 9A2, 10A1, 10A2) of the layer elements (9, 10), via projections (6A, 7A).

10. The bearing mechanism according to claim 5, wherein, in the assembled state, the layer elements (9A, 10A), formed with lower stiffness, each encompass at least sections of the transverse leaf spring (1) with stop regions (18A, 18B) in the longitudinal direction (x) of the vehicle and the vertical direction (z) of the vehicle, and the stop regions (18A to 19B), in the contact regions which face at least one of the transverse leaf spring (1) and the outer bearing shells (6, 7), are have at least one of projections and recesses which are oriented at least approximately in the longitudinal direction (x) of the vehicle.

11. The bearing mechanism according to claim 1, wherein the outer bearing shell device (30) comprises two outer bearing shells (6, 7) that are connectable and which encompass at least in sections of the insertion devices (9, 10).

12. The bearing mechanism according to claim 11, wherein the insertion devices (9, 10) are connectable to the outer bearing shells (6, 7) and the transverse leaf spring (1) via a bolt device (8) which connects the outer bearing shells (6, 7) together and to a vehicle chassis, at least in a force locking manner.

13. The bearing mechanism according to claim 1, wherein the outer bearing shell device (30) comprises a one-piece bearing ring element (31), and the insertion devices (9, 10) are operatively connected, at least in a force locking manner, to the bearing ring element (31) and to the transverse leaf spring (1) via tensioning elements (35, 36; 35A, 35B, 36A, 36B).

14. The bearing mechanism according to claim 13, wherein the tensioning elements (35, 36, 35A, 35B, 36A, 36B) are formed with at least one wedge-shaped region that is disposed either between the insertion devices (9, 10) and the transverse leaf spring (1), or between the insertion devices (9, 10) and the bearing ring element (31).

15. The bearing mechanism according to claim 14, wherein at least a part of the tensioning elements (35, 36) are operatively connected to the bearing ring element (31) for creating a tensioning element-side pretensioning force on the insertion devices (9, 10) and the transverse leaf spring (1), and the pretensioning force is supported on a shoulder (40) of the bearing ring element (31).

16. A bearing mechanism (4) for mounting a transverse leaf spring (1) adjacent an axle of a vehicle, the bearing mechanism (4) comprising:

insertion devices (9, 10);

an outer bearing shell device (30) encompassing at least some regions of the insertion devices (9, 10), and each of the insertion devices (9, 10) comprising at least two layer elements (9A, 9B, 9C, 10A, 10B, 10C) with different measures of stiffness, the insertion devices (9, 10) each being disposed between the outer bearing shell device (30) and the transverse leaf spring (1);

the transverse leaf spring (1) having, with respect to a vertical axis (z) of the vehicle, a top side (111) and a bottom side (112), each of the top and the bottom sides (111, 112) having a support surface (11A, 11B) with a recess (11C, 11D) in which the insertion devices (9, 10) engage in a form-locking manner;

the recesses (11C, 11D) of the transverse leaf spring (1) each being delimited, in a longitudinal direction (x) of the vehicle, by edge regions (115, 116) of a respective one of the top side (111) and the bottom side (112); and the recesses (11C, 11D) have a shallower depth, at the edge regions (115, 116), than a central region located between the edge regions (115, 116) with respect to the longitudinal direction (x) of the vehicle.

\* \* \* \* \*